(12) United States Patent
Dohrmann

(10) Patent No.: US 8,540,520 B2
(45) Date of Patent: Sep. 24, 2013

(54) APPARATUS AND METHOD FOR INSTRUCTIONAL INFORMATION DELIVERY

(75) Inventor: Bernhard Dohrmann, Madison, AL (US)

(73) Assignee: Life Success Academy, Madison, AL (US)

(*) Notice: Subject to any disclaimer, the term of this patent is extended or adjusted under 35 U.S.C. 154(b) by 208 days.

(21) Appl. No.: 12/629,801

(22) Filed: Dec. 2, 2009

(65) Prior Publication Data

US 2010/0075287 A1 Mar. 25, 2010

Related U.S. Application Data

(63) Continuation of application No. 09/981,287, filed on Oct. 18, 2001.

(60) Provisional application No. 60/241,359, filed on Oct. 19, 2000, provisional application No. 60/282,877, filed on Apr. 11, 2001.

(51) Int. Cl.
*G09B 7/00* (2006.01)
*G06F 17/00* (2006.01)
*G06F 3/14* (2006.01)

(52) U.S. Cl.
USPC ........... 434/324; 434/322; 434/326; 434/350; 434/362; 434/365; 715/730; 715/731; 715/732; 715/814; 715/844; 715/867

(58) Field of Classification Search
USPC ................. 434/350, 365; 715/730–732, 814, 715/844, 867
See application file for complete search history.

(56) References Cited

U.S. PATENT DOCUMENTS

| | | | |
|---|---|---|---|
| 4,876,657 | A | 10/1989 | Saito et al. |
| 5,002,491 | A | 3/1991 | Abrahamson et al. |
| 5,231,578 | A | 7/1993 | Levin et al. |
| 5,303,042 | A | 4/1994 | Lewis et al. |
| 5,310,349 | A | 5/1994 | Daniels et al. |
| 5,385,475 | A | 1/1995 | Sudman et al. |

(Continued)

OTHER PUBLICATIONS

Rissmann BJ. "The Effectiveness of Super Teaching as an Instructional Technology in Resource Education". [Retrieved Mar. 23, 2011] Retrieved from Flashpoint Blog <URL:http://www.flashpointblog.com/wp-content/uploads/2009/09/02/superteaching_prospectus_web.doc>.*

(Continued)

*Primary Examiner* — Nikolai A Gishnock
(74) *Attorney, Agent, or Firm* — Kunzler Law Group

(57) ABSTRACT

An apparatus and method are disclosed for delivering instructional information and include displaying instructional information on several visual displays prior to a triggering event and displaying the instructional information in an instructional varying display pattern on the at least three visual displays after the triggering event so a person viewing the instructional varying display pattern is unable to detect a repeatable pattern. Also included is displaying background information on each display not displaying instructional information. The background information is displayed with a background varying display pattern so a person is unable to detect a repeatable pattern. The instructional varying display pattern and the background varying display pattern include varying one or more information display attributes, such as which of the at least three visual displays is displaying the instructional information, duration of a display of the instructional information, transition effects, and/or timing between displays of the instructional information.

25 Claims, 12 Drawing Sheets

(56) References Cited

U.S. PATENT DOCUMENTS

| | | | |
|---|---|---|---|
| 5,448,287 | A | 9/1995 | Hull |
| 5,488,385 | A | 1/1996 | Singhal et al. |
| 5,574,574 | A | 11/1996 | Kawamura |
| 5,694,141 | A | 12/1997 | Chee |
| 5,746,599 | A | 5/1998 | Lechner |
| 5,823,786 | A | 10/1998 | Easterbrook |
| 5,850,250 | A | 12/1998 | Konopka et al. |
| 5,859,623 | A | 1/1999 | Meyn et al. |
| 5,920,674 | A | 7/1999 | Okita et al. |
| 5,964,064 | A | 10/1999 | Goddard et al. |
| 6,034,652 | A | 3/2000 | Freiberger et al. |
| 6,088,004 | A | 7/2000 | Domae et al. |
| 6,106,298 | A | 8/2000 | Pollak |
| 6,130,668 | A | 10/2000 | Stein |
| 6,298,218 | B1 | 10/2001 | Lowe et al. |
| 6,397,036 | B1 | 5/2002 | Thean et al. |
| 6,398,556 | B1 | 6/2002 | Ho et al. |
| 6,411,796 | B1 | 6/2002 | Remschel |
| 6,585,518 | B1 | 7/2003 | Jenkins et al. |
| 6,647,119 | B1 | 11/2003 | Slezak |
| 6,669,346 | B2 | 12/2003 | Metcalf |
| 8,348,675 | B2 * | 1/2013 | Dohrmann .................... 434/326 |
| 2002/0132216 | A1 * | 9/2002 | Dohrmann .................... 434/362 |
| 2008/0248455 | A1 * | 10/2008 | Dohrmann .................... 434/365 |
| 2009/0148825 | A1 * | 6/2009 | Dohrmann ................. 434/307 R |

OTHER PUBLICATIONS

Kolowich S. "University Had Short Attention Span for 'Super Teaching'". USA Today, posted May 27, 2010 [Retrieved Mar. 23, 2011] Retrieved from USA Today [online] <URL:http://www.usatoday.com/news/educational/2010-05-27-IHE-Super-Teaching-U-Alabama-27_ST_N.htm>.*

"International Learning Trust". Feb. 7, 2005. [Retrieved Mar. 23, 2011] Retrieved from Internet Archive Wayback Machine <URL:http://replay.waybackmachine.org/20050207054551/ http://bernharddohrmann.com/ILT.HTM>.*

Ramhold J. "University Dissolves 'Super Teaching' Partnership". Apr. 14, 2010. The Exponent. 3p. [Retrieved Mar. 27, 2011] Retrieved from The Exponent [online] <URL:http://exponent.uah.edu/?p=2538>.*

Pulos L. Super Teaching to Quantum Learning. 3p [Retrieved Mar. 23, 2011] Retrieved from Flashpoint Blog <URL:www.flashpointblog.com/wp-content/uploads/2009/09/quantumlearn.pdf>.*

"Super Teaching Technologies for the Classroom". Oct. 11, 2004 [Retrieved Mar. 23, 2011] Retrieved from Internet Archive Wayback Machine <URL:http://replay.waybackmachine.org/20041011202157/http://bernharddohrmann.com/SuperTeachingTechnologies.htm>.*

"Super Teaching Theory". Feb. 7, 2005 [Retrieved Mar. 23, 2011] Retrieved from Internet Archive Wayback Machine <URL:http://replay.waybackmachine.org/20050207230749/http://bernhard-dohrmann.com/ SuperTeachingTheory.htm>.*

LeCompte B. "Super Teaching: Why is UAH involved with a 'very dangerous con man'"? Sep. 2, 2009 32p [Retrieved Mar. 23, 2011] Retrieved from Flashpoint Blog <URL:http://www.flashpointblog.com/wp-content/uploads/2009/09/02/super-teaching-why-is-uah-involved-with-a-very-dangerous-con-man.htm>.*

PCT/US2007/080484, International Preliminary Report on Patentability, Apr. 16, 2009.

PCT/US2007/080484, International Search Report and Written Opinion, Apr. 8, 2008.

U.S. Appl. No. 11/866,935, Office Action, Dec. 6, 2010.

* cited by examiner

| | | |
|---|---|---|
| TEACHER IMAGE 90 SECONDS WALLPAPER 20 SECONDS<br><br>STUDENT IMAGE 9 SECONDS WALLPAPER 10 SECONDS | TEACHER IMAGE 120 SECONDS STUDENT IMAGE 6 SECONDS TEACHER IMAGE 90 SECONDS<br><br>ELMO IMAGE 60 SECONDS STUDENT/ TEACHER IMAGE 6 SECONDS | TEACHER IMAGE 90 SECONDS STUDENT 2 IMAGE 7 SECONDS WALLPAPER 10 SECONDS<br><br>STUDENT/ TEACHER IMAGE 9 SECONDS WALLPAPER 20 SECONDS |
| STUDENT IMAGE 5 SECONDS WALLPAPER 30 SECONDS | WALLPAPER 5 SECONDS TEACHER IMAGE 90 SECONDS | STUDENT IMAGE 5 SECONDS WALLPAPER 10 SECONDS |
| TEACHER/ STUDENT IMAGE 9 SECONDS WALLPAPER 10 SECONDS | ELMO IMAGE 30 SECONDS WALLPAPER 6 SECONDS TEACHER IMAGE 90 SECONDS | ELMO IMAGE 10 SECONDS WALLPAPER 20 SECONDS STUDENT IMAGE 6 SECONDS |

FIG. 18

| EFFECT 1 | EFFECT 5 | EFFECT 9 | EFFECT 13 | EFFECT 17 |
|---|---|---|---|---|
| EFFECT 2 | EFFECT 6 | EFFECT 10 | EFFECT 14 | EFFECT 18 |
| EFFECT 3 | EFFECT 7 | EFFECT 11 | EFFECT 15 | EFFECT 19 |
| EFFECT 4 | EFFECT 8 | EFFECT 12 | EFFECT 16 | EFFECT 20 |

FIG. 19

APPARATUS AND METHOD FOR INSTRUCTIONAL INFORMATION DELIVERY

CROSS REFERENCE TO RELATED APPLICATIONS

This application is a continuation application and claims priority to U.S. patent application Ser. No. 09/981,287, filed Oct. 18, 2001 by inventor Bernhard J. Dohrmann, entitled "APPARATUS AND METHOD FOR DELIVERY OF INSTRUCTIONAL INFORMATION," which is hereby incorporated by reference including the appendix of application Ser. No. 09/981,287, and which claims the benefit of U.S. Provisional Application No. 60/241,359, filed Oct. 19, 2000 by inventor Bernhard Dohrmann, entitled "APPARATUS AND METHOD FOR SUPER TEACHING," and claims the benefit of U.S. Provisional Application No. 60/282,877, filed Apr. 11, 2001 by inventor Bernhard Dohrmann, entitled "ENHANCED APPARATUS AND METHOD FOR SUPER TEACHING." The contents of the Provisional Applications Nos. 60/241,359 and 60/282,877 are hereby incorporated by reference in their entirety. Portions of Provisional Application No. 60/282,877 are included in the specification as an Appendix to this application.

FIELD OF THE INVENTION

The invention relates generally to the field of teaching, and more specifically, to an interactive multimedia information delivery system for teaching.

BACKGROUND OF INVENTION

Learning has become more than lectures, taking notes, repetitions and dull, non-stimulating classrooms. Two of the most important elements of learning are "DESIRE and INTEREST." By stimulating students' interest, the level of enthusiasm and motivation increases, and students will less likely become distracted or disinterested. Consequently, interested students will make more effort in preparation for involvement in, and attendance at, classroom lessons, which will enhance the effectiveness of the educational system. The role of instructors in classrooms is to create the groundwork for student motivation by inspiring them, piquing their imaginations, stimulating their interests and tapping into their creativity.

Most education experts agree that success in the educational process depends on the level of retention of the material to be learned, based on the fact that the brain does not pay attention to everything. The rate of retention drops where there are uninteresting, boring or emotionally-flat lessons, since the brain simply drifts off to find other stimuli that are more interesting. Students will not remember dull, colorless or monotonous materials. If the classroom environment is creative, enlightening, inspiring and motivating, the goal of creating an effective and positive learning atmosphere is achieved. If the cold, lifeless and boring classroom can be converted into a vibrant, interesting and stimulating multimedia experience, students will have greater interest in attending classes and faculty effectiveness will improve dramatically. A successful educational experience should be "fun" for both faculty and students in day-to-day learning, but "fun" is often "frowned upon" by some educators. Students pay more attention to lessons that are presented in a way that is "fun." Escalated student interest becomes the stimulus for increased improvements in other learning techniques and resources such as field trips, research and independent studies.

In the past, when computers and interactive software moved into classrooms, educators thought superior performance would result and anticipated that computers and interactive software would positively impact learning, and that student test scores would dramatically improve with these tools and methods. However, the results were very different from what was originally expected. It has become widely accepted that computer technology in the classroom fails to teach, accelerate overall comprehension, or to hold student attention over any length of time. There is no doubt that live instructors teach learners and have no substitute or replacement in the learning process for human beings. It is impossible to automate live instruction since only live instructors can sense the mood of the student body and attend, by instinct, and artistry to the velocity, momentum and acceleration of day-to-day learning. Humans are social learners and require social learning in classrooms in which the meaning of the social experience in terms of context, community, state and nation may be fully understood. With this rapid realization, computers are mainly used to assist students to CONFIRM that which is already LEARNED rather than to impart the learning itself.

Later, virtual-reality devices provided no further improvement over computers. Therefore, the mere application of computers in the classroom did not make much improvement and represented misapplied resources, wasted opportunity dollars, and can now be defined as a mistake based on performance evaluation and test scores. Need for a teaching tool that would employ the benefits of new technologies and enhance learning was considered vital.

DISCLOSURE OF INVENTION

The present invention provides to instructors and students, alike, a comprehensive tool for information delivery and education that conforms the classroom into a conduit of exciting teaching and learning possibilities. The development of this innovative invention, which is called "Super Teaching," is based on research results which indicate that for human beings, each a highly differential learner, tri-screen delivery of information works to elevate human concentration patterns by "leading" the mind, rather than having the mind on "pause" waiting for information to move forward. Technology-assisted teaching produces superior results evidenced by improved test scores when compared to those without technology assistance. The present system and method provides a saturation learning environment that stimulates both left and right sides of the brain. In this type of learning, with more integrated involvement from an instructor and a multimedia system, greater levels of retention are obtained when compared to instructor assistance or the automated system is missing from the classroom experience.

Another aspect of the invention is based on its ability to implant stronger and more powerful impressions in more brain locations. Thus, the possibility of dynamic and involuntary recall of newly-acquired information is increased. These conclusions are drawn, in part, from the study of brain waves, and in part from the work citing the summary total of redundant display of information using instructor-assisted resource of the present invention, vs. when such assistance is not provided. Information is presented repetitively, both in auditory as well as visual format, which is retained and recalled more effectively.

According to another aspect of the invention, the brain, operating within a classroom environment that is equipped with the present inventions, the focus is on teaching led by the information delivery system at a higher level. The well-known issue of "mind wandering" within any context of human communication is significantly defeated within an assisted environment. The brain is held on the topic by random patterns presented to human senses using the present information delivery system. The obtained effect is induced without significant retraining of the instructor as to content or sequence. The instructor proceeds to deliver content and sequence, as before, while the student body demonstrates visible and invisible measurable gains related to attention/input of information and retention/output of information. Existing lesson plans are integrated into the system and applied without modification.

Another aspect of the invention relates to a method and apparatus for information delivery that enables learning at fast rates with an improved degree of retention. Expectancy and attitude, each a huge contributor to the learning process, enhances learning, especially when instructor assistance and the present invention are combined in the classroom environment.

Another aspect of the invention relates to a system for providing integrated-information delivery capabilities from audio and video sources into screens and speakers in a classroom. The controlling unit provides sequence, duration and content modifications to the display system from the sources that provide data. Each source communicates with the screens, the speakers and the control unit for receiving control commands and transferring data signals.

Yet another aspect of the invention provides for the software configured to control the content and sequence of information display on display screens. The software includes databases, control commands for each data-source device and specific conditions for formatting the audio and visual display.

In another aspect of the invention, user-friendly graphical user interface provides active controls for each data source. A control panel, exclusive to a particular data-source device is displayed on a screen, which is used by the instructor to modify the way data from that source is manipulated and displayed. The interface provides for an active-source window to display what the screens are actually displaying.

Another aspect of the invention is represented in an apparatus and method for an integrated REMOTE-LEARNING facility. The delivery of educational information may be over a network system, a cable or related systems, a DVD or CD-ROM system, or any other classroom technology which may use a combination of various systems.

A further aspect of the invention relates to a unique software. The software product, in accord with this aspect, includes at least one machine-readable medium and programming code, carried by the medium. A computer readable medium, as used herein, may be any physical element or carrier wave, which can bear instructions or codes for performing a sequence of steps in a machine-readable form. Computer-readable mediums include, but are not limited to, non-volatile media such as optical or magnetic disks, volatile media such as dynamic memory, and transmission media such as coaxial cables, copper wire and fiber optics. Transmission media may comprise acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, as well as media bearing the software in a scannable format, a carrier wave as described hereinafter, or any other medium from which a computer can read. A carrier wave medium is any type of signal that may carry digital information representative of the instructions or code for performing the sequence of steps. Such a carrier wave may be received via a wire-line or fiber-optic network, via a modem, or as a radio-frequency or infrared signal, or any other type of signal which a computer or the like may receive and decode.

BRIEF DESCRIPTION OF THE DRAWINGS

FIG. 18 depicts a sample super teaching table coded to software, according to one embodiment.

FIG. 19 depicts a table containing switcher like effects, according to one embodiment.

DETAILED DESCRIPTION OF THE INVENTION

The information delivery system and method represented by the present invention are based on increased level and duration of attention that results in improved retention of the material. The information delivery system is based on the theory that an automated configuration of multimedia in the classroom creates involuntary elevations in human concentration uniformly applied to the entire student body. Information is presented, repetitively, both in auditory as well as visual formats. Additionally, the system is a saturation learning method for stimulating both left and right side of the brain, with more integrated involvement of retention than when such multimedia instructor assistance in this format is missing from the classroom experience.

The present techniques implant stronger and more powerful impressions in more brain locations creating increased dynamic involuntary recall of newly acquired information. The level of attention is increased as the brain is continuously attracted to the lesson and finds it more interesting than other available stimulants. The focus of brain changes from one topic to another as the level of interest in the first one is diminished. The present invention, by creating an environment that is interesting to the brain, keeps the attention of the lesson and prevents "mind wandering" and depleted attention to the lesson. The brain is held on topic by the random pattern presented to the human senses to become the topic that the brain is most interested.

Flexibility of the system allows applications of different instructional plans without need for modifying the system following every classroom session. The system is operated at a high level of automation and application of technology for education within a typical classroom environment. Ease of operation of the system helps instructors to integrate the system into their classrooms because their interaction with technology requires virtually no retraining.

Figure 1A:
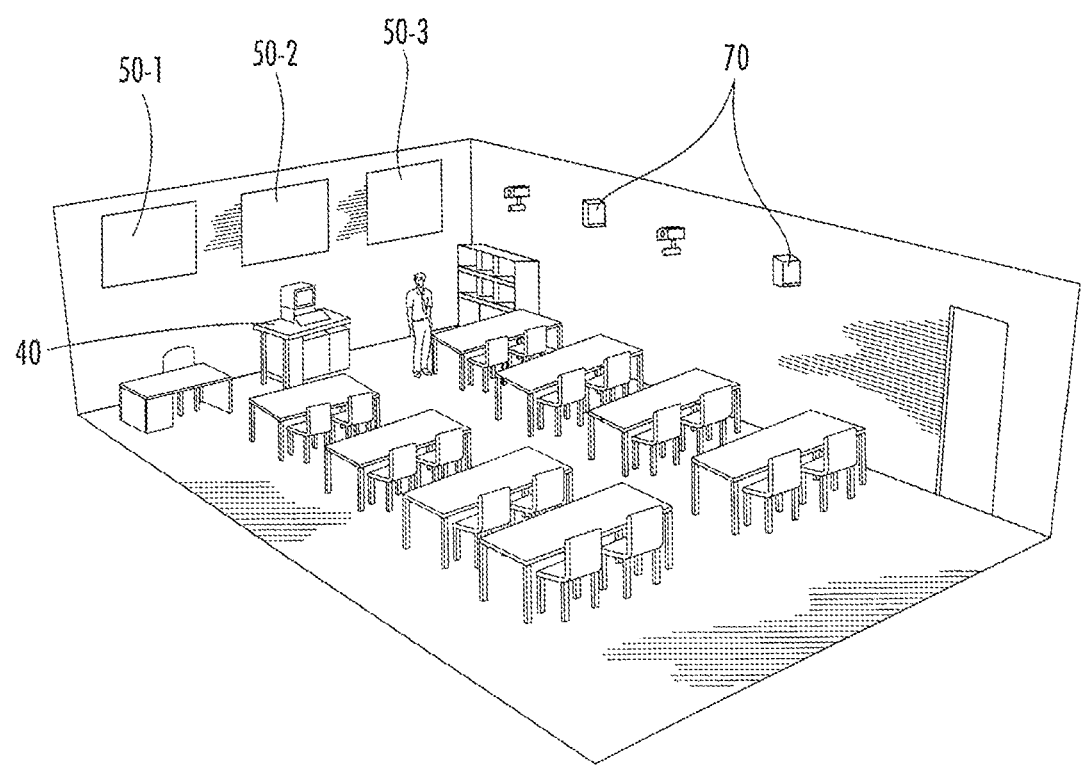
FIGS. 1A-1C show a classroom equipped with Super Teaching system and the detail of the display screens.
Figure 1B:
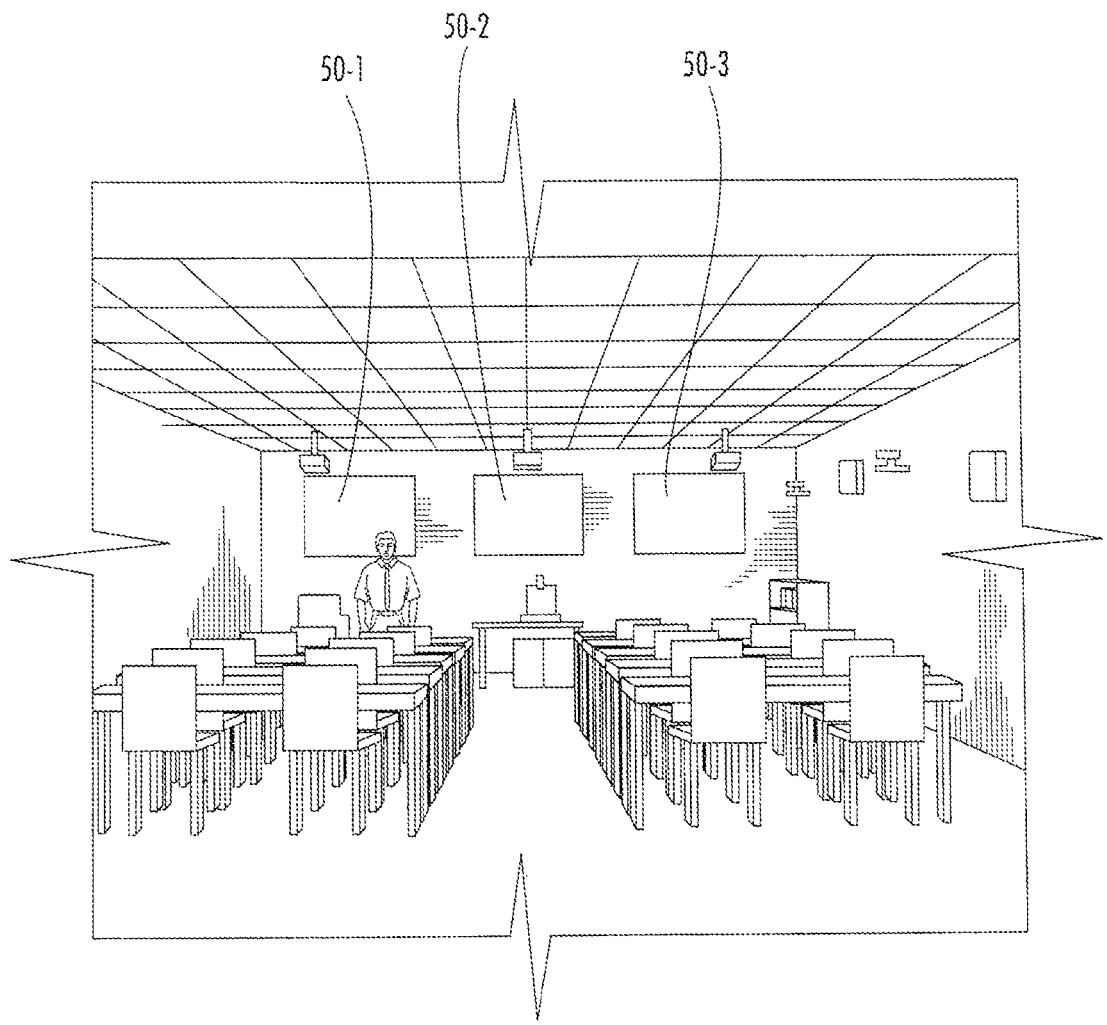

Referring now to FIGS. 1A and 1B, a classroom equipped with the present information delivery system is shown. Instructional information is delivered via three display screens 50-1, 50-2 and 50-3 that vary images with video wall like effect controlled by an algorithm residing in the hardware of the system. The three screens may be part of one large screen or separate devices. Each screen may be divided into portions displaying separate images. The audio part of the information is delivered to output devices such as speakers 70. Control interface 40 at the instructor's station provides a screen and an input device for the instructor to select one of the information sources available for receiving information or make changes to their settings. The control interface may be a part of a PC with a screen and input devices such as a mouse, keyboard, touch screen, or a stylus. The screen displays control buttons in graphical user interface format and an active source window to observe what is being displayed on the three display screens or any other output device. Details of the control display will be described later with regard to FIG. 2. The instructional information may be delivered to only display screens or speakers or both depending on the desired effect. The screens, with controlled patterns of display, substantially enhance information flow and impact the level of concentration achieved by the student to a higher level than what would have been possible without the effect of the present invention. The optimum number of display screens is linked to the cost of multiple screens in a classroom and the level of impact they have on improved learning and test scores. When the system is operated with three screens, the results showed optimum learning without unwanted distractions.

Figure 1C:
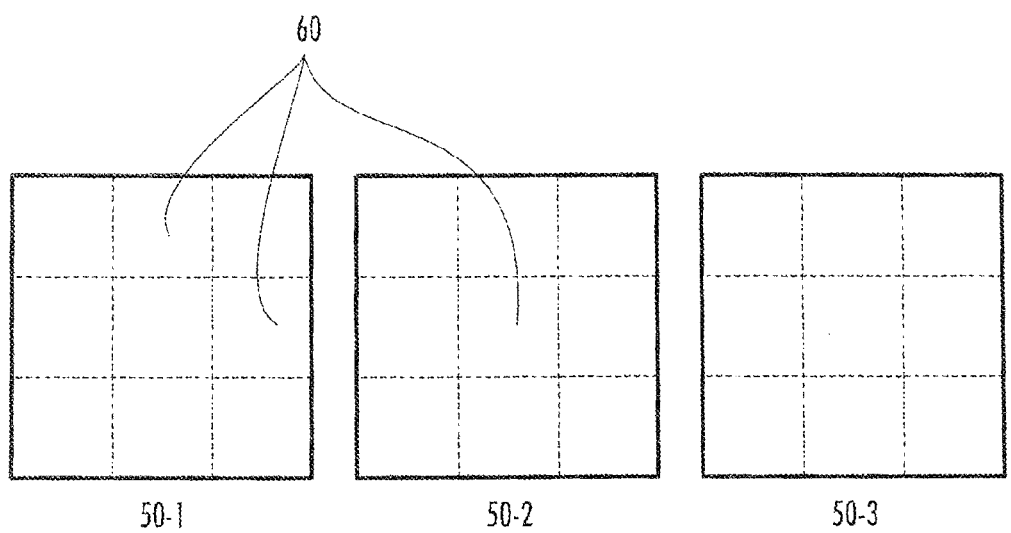

As shown in FIG. 1C, display system 50 includes three display screens 50-1, 50-2 and 50-3 where each screen is further divided into multiple areas. In FIG. 1C, each screen has nine display areas 60 although other numbers of display areas may be used. The display system alternatively includes a single wall screen on which multiple images are displayed on different parts of the screen. Each image area may, in turn, be divided into multiple areas. The screens are independently controlled so that different images may be shown in each area with different sequence and duration. Alternatively, one image may occupy all nine areas or any other divisions may be used to display images on parts or all of each display screen. An image in the form of wallpaper may occupy all the areas whereas another image is superimposed on one or more areas. Stored tables operated by the system software provide variables to mix and match images and preclude duplication of image pattern to minimum frequency. Furthermore, a maximum number of impressions, movements and redundancies for any single item of information, may be created by the system.

The display control component of the software generates commands that are sent to servers for switching video images, partitioning each screen into display areas or provide special effect schemes. Displayed images may be manipulated by different special effects such as fader or mixer to provide for transition from one image to another or from one source to another. Similar control switches provide control and special effects for the audio output. In addition to switching between different audio sources, special effect, mixing and enhancing the audio quality are performed as a part of audio control. The audio parts of the information from distant sources, as well as local sources, such as microphones in the class, are processed to reduce the effect of echo and feedback.

The instructor is able to override the format as well as the sequence of information displayed by manipulating the control buttons displayed on instructor's control panel. Overriding the control by the software of the displayed information, the display can be modified or additional information may be displayed, as the instructor finds suitable. The override capabilities affect the way information is displayed as well as its content. Other input sources such as cameras, remote learning, Internet and other audio/visual sources may provide additional or overriding images for display. The override option enables the instructor to match the lesson to the class characteristics or updates that have recently become available. The control may be reverted back to the software at any time that the override option is not needed.

Another capability that, similar to the override option, allows flexibility and instructor's input during the instruction, is the annotation device. Notes and comments related to various sections of the instruction plan are added through annotation device that overlays an image of the comments onto the video output. The instructor interaction and manipulation of the data sources or devices are achieved through a computer system using any known human-computer interface devices. Upon input by the user, the computer updates the environment in response to the instructor's input through the keyboard, mouse, touch pads or stylus. The computer then provides feedback to the instructor by displaying information on the screen. The software is configured to provide user-controlled graphical objects such as a graphical representation of the actual control buttons of data source devices. The display of the graphical representation of the control buttons of a device allows the user to simply select and "push" buttons in the same way an actual device is operated.

Figure 2:
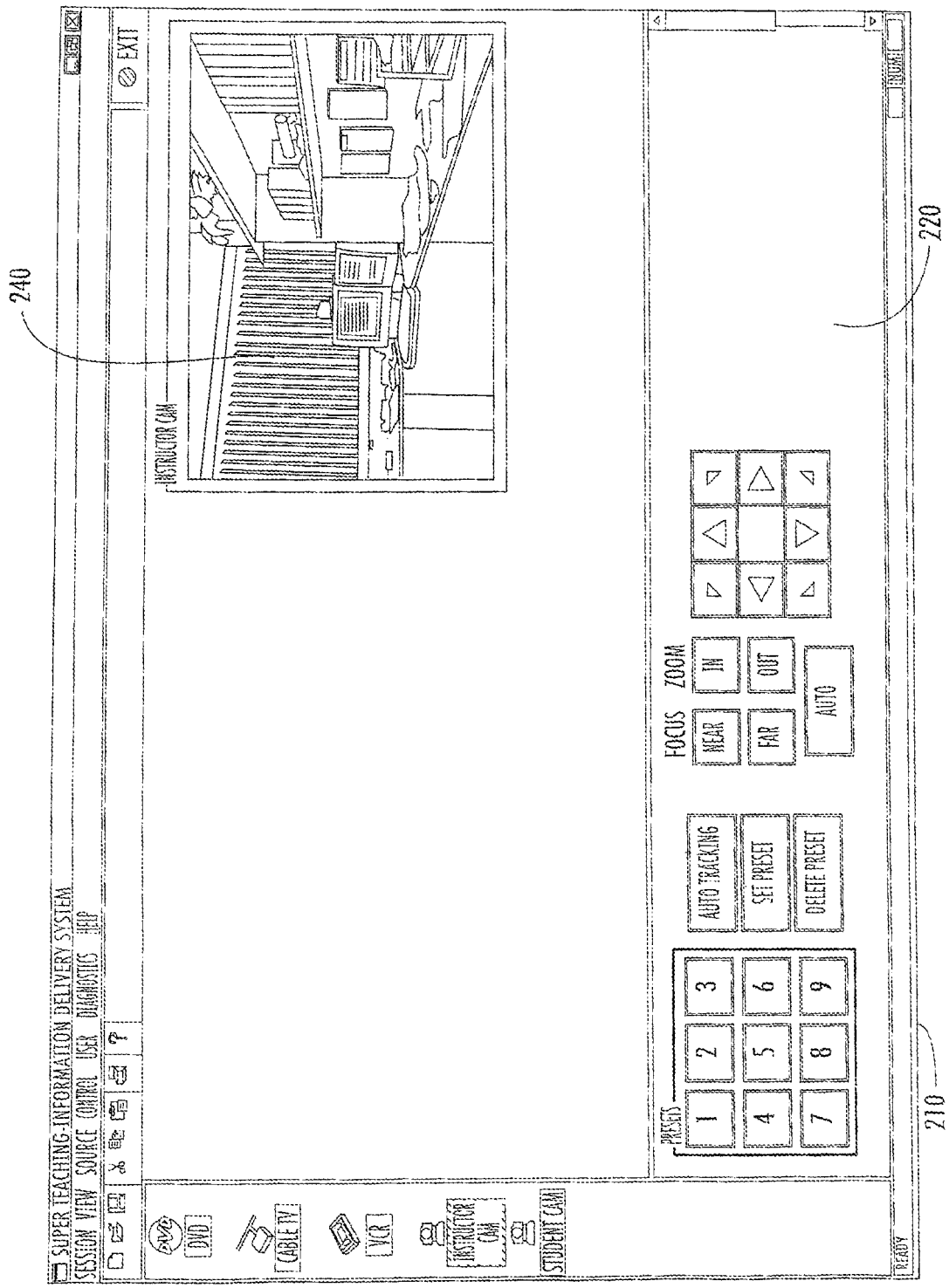
FIG. 2 shows an exemplary user interface for controlling information delivery in the multimedia environment related to the Super Teaching apparatus.

Specific details of how the instructor controls data sources or devices that provide video images or audio data are shown in FIG. 2. The example shown here is displayed on a monitor in the form of a touch panel or may receive input from different input devices such as keyboard, a mouse, a stylus and a touchpad. In the case of touch panel, the screen has touch control capabilities that requires only touching the displayed button when a selection is to be made. User interface 210 shown here is an example of displaying a control panel for integrating various control components of the information delivery system in the classroom. Access to each source is included on the control panel through a graphical representation. A specific control panel is displayed for each source when that source is selected on the control panel. The interface for each source control panel emulates the control buttons that are typically present on the actual equipment. For example, a VCR control panel has PLAY, STOP, and PAUSE, etc. buttons, in a configuration similar to those on the actual equipment, displayed on the screen. Similarly, other sources such as cameras, microphones, DVD and cable tuners have their specific control panel displayed on the screen. In case of implementing a touch screen display, the device control panel provides for easy selection and manipulation of displayed information without excessive interruption of the class instruction. A display area on the left hand side of the touch panel is specified for displaying graphical representations or icons related to various data source devices. The selection of a multimedia component shown on the left hand side of the screen causes the control panel associated with that source to be displayed in window 220 for source control panel. Additional device control panels may be simultaneously displayed in window 220, which will be sized to fit more control panels.

Additionally, active video source window 240 may be displayed on the remaining area of the touch panel to enable the instructor to observe the information that is actually displayed on three display screens in the classroom without need for looking up and away from the control screen. Images from the cameras or other data sources may be displayed in the active source window for instructor's view before, or simultaneously, with the display on the classroom screens. Since the PC and the software are Windows®-based and run on current version, other Windows® capabilities for displaying the active video source window and device control panels may be used to modify the way each window is displayed or hidden. Using the device control panels and manipulating the controls for each device, the instructor provides his/her input to the lesson before the lesson begins. These instructor input commands combined with the control instructions of the software, according to a set of rules enforced by the software, provide the information for display on the three display screens, manipulate images shown to the classroom in different combinations of audio or video effects and incorporate instructor's inputs into the audio and video outputs. The integrated display of information and instructor's interaction is applied as a seamless learning tool for achieving a high degree of retention and recall of the material.

The control screen of FIG. 2 further enables information from video players, DVD, cable, disk drive, digital camera or Internet be displayed in any pattern that is selected by the instructor. A video STOP icon further overrides the automatic image input by replacing rule-driven patterns contained in the software. Thus, the instructor interjects additional information, as the students' specific learning state requires. For example, the instructor selects the camera icon and a camera control dialogue box is displayed. Through another selection of the active source button, the actual image displayed by the active source is shown in window 240 of FIG. 2. The instructor adjusts different aspects of the display by manipulating the control buttons of the cameras control dialogue box. Once the images from VCR are ready to be shown, the camera control panel is closed and the VCR control dialogue box comes up on the screen. Therefore, the interactive aspect of the system is integrated with the software driven sections where the instructor may elect the icon for camera and full screen display and include camera images displayed on all three screens and later go back to the software routine and software-selected images from the VCR. Additional interactive effects such as voice or microphone activation for students may be selected from the control panel for full instructor-student interaction.

Similar control commands related to the content and sequence of displayed information may be received from a remote control device in the instructor's control panel. The remote control provides control over each data source in a somewhat-limited way without the graphical interface and the active source display window. However, the remote control option frees the instructor from the desk or console at the instructor's station where the graphical user interface is displayed on a screen and adds to the flexibility in movement of the instructor or positioning the information display components in a classroom.

Image deliveries are special effect-induced with a table containing rules for providing multiple effects for displaying images with optimum visual impact, such as wipes, swipes, folds, page turn, etc. combined with complimenting audio effects. Transitions are driven by switcher like effects rotational to tables, that software remembers and applies to maximize variable component of effect table. Timing of the display pattern is also controlled by the system software and the related rules table and provides different effects by either simultaneously changing the images or replacing/rotating them at different intervals. For example, if the last image up was three minutes in duration the next image up may be 90 seconds in duration before a pattern shift. Specifically, selected images provide the background pictures for idle or transition periods when no other activity on the screens is present. Time limits for duration in which displaying each kind of image, such as instructor's face, students' image or other info, are built into the software to allow maximum effectiveness without unwanted distraction from the core educational aspect of the lesson. The instructor further controls the duration and type of display using control buttons and keys on the control screen of FIG. 2. Different types of information such as Internet pages, presentations or spreadsheets and announcements, may be displayed in moving, redundant patterns, which reintroduce and reinforce the information as instructor and students interact and compels higher attention.

Timing for variations is remembered by the system such that the combination of movements is varied, so that student learners have challenges to every predicting the pattern variables. Making it difficult to predict the pattern is a key element of the super teaching design. One of the tables is envisioned as an effect control system. The effect control system remembers patterns and alternates patterns to produce "unlearnable" image management. It will control video wall effects such that memory would dictate variations to provide virtually unlimited possibilities and variations such that predicting pattern type becomes virtually impossible for the viewer.

The system rotates images by default, using table driven time-outs or conditional loops to alter images appearing on the screen. At any time interval, images may be overridden by instructor to place a single source image on all three screens in two modes. First override mode provides a time out to again move images after variable default. The system remembers previous time outs, and varies the pattern to provide maximum alternatives. According to one embodiment, the pattern will not repeat in the near term. In the second mode, images remain static and will not rotate until the instructor selects the first mode. The system may also vary patterns, change the number of areas each screen is divided into or move data for redundancy, and involve the instructor and students interactively to elevated concentration and retention. Special images in a predetermined combination may be selected to promote higher level of interaction and minimize distraction.

The present system, unlike those using fixed components, remains up to date as an information delivery and display resource because the display media can be updated with newer tools as they enter the market. For example, the display screens may be replaced at any time with higher resolution models while improved speakers may enhance the audio part. The control scheme of the entire system may also be updated as more powerful hardware and software components are introduced. This built-in flexibility adds to the value of the tool since new components replace the old ones without changing the relationship among various parts or the overall method of delivery of information. Examples of upgradeable components are computers, graphical tools, and Internet friendly software and multimedia software. Virtually all of these components can become obsolete quickly. However, with the built-in flexibility, the pressure of modernizing the classroom is reduced and the question, as to what the best technology decision for the next generation is, may be answered more easily. Installations, while only slightly more costly than a typical computer lab in a modern high school, remains current as a technology for decades. The overall program affordability when weighed against achieving the long-term missions, makes the present invention a wise choice for cost-conscientious entities.

The present invention operates as an automated system, with minimal direct instructor involvement. The primary benefits from the instructor's point of view are ease of use and degree of automation that provide flexibility without retraining Cumbersome equipment such as white boards, black boards and overheads are removed. Additionally, existing instructor notes may be used without any modifications and instructors continue the delivery of lessons with minimal retraining, such as about one day. From the students' point of view, classrooms become fun to participate in, while test scores are improved. Fast delivery of images, sounds or any type of data keeps students interested and elevated concentration and retention are achieved. Moreover, students are distracted less, having elevated motivation and learning experience.

Figure 3:
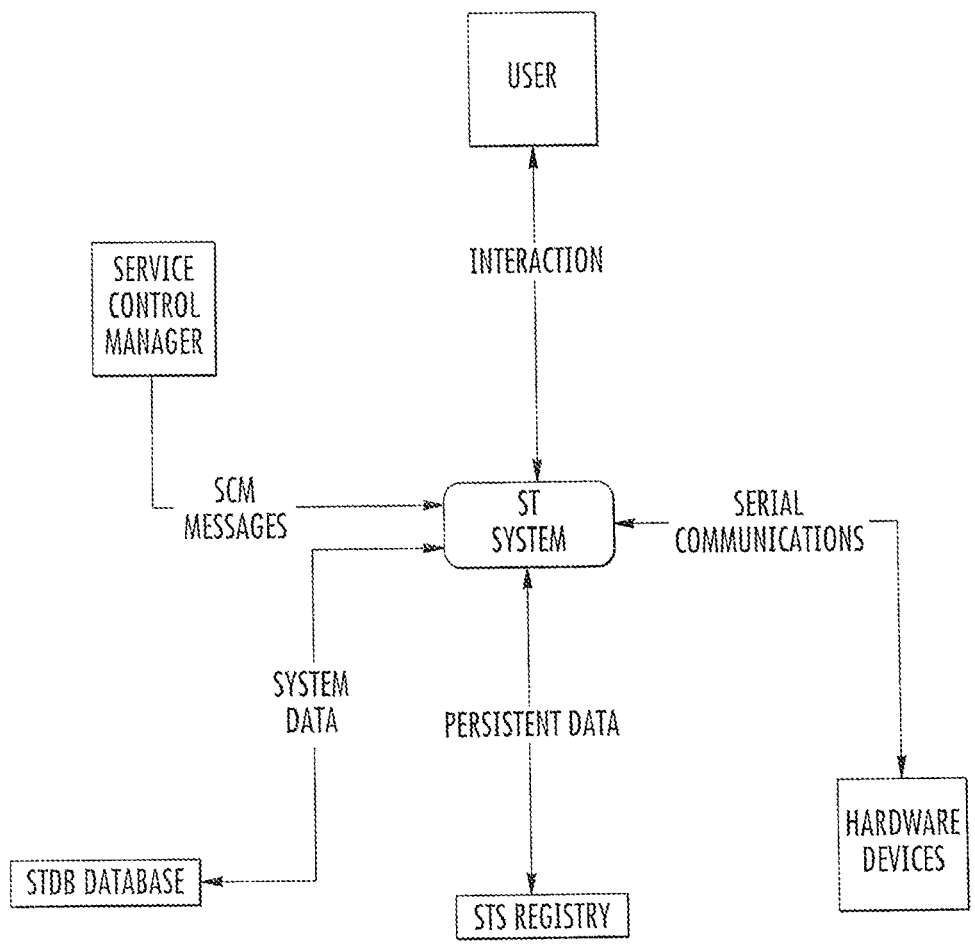
FIG. 3 depicts an overview of the information delivery system of the present invention.

Referring to FIG. 3, a schematic view of the information delivery system is shown. When the power is turned on, a service control manager starts up the system, checks the registry and starts all the device servers. The system remains in an inactive state with all the data devices ready in the background. The main system, which controls all the components of information delivery, interfaces with the user through interactive commands entered in the control panel of FIG. 2. Hardware devices and data sources are accessed through serial communications and connected to the output devices and the main system. Each data source device communicates in its specific language to a device server that monitors and controls that specific device. As soon as a data source is ready to provide data, the display control component of the software dictates the combination of different types of data to be delivered to the three display screens according to the conditions controlled by a predetermined set of rules. A collection of databases providing conditions for text, image and audio data and their output sequence, duration and pattern provide input to the system while a system registry provides other data. The collection of databases includes topics and general background information or accompanying material that may be catalogued according to topic, audience and customized criteria.

With the seamless control and data retrieval scheme of the system, there are only minimal requirements for instructor involvement. The system is designed to assist professional educators with minimal technology skill from the educator-user. Instructions occur every day, precisely as they did prior to the addition of the present system, requiring no substantial change. With most alternative technologies, substantial instructor retraining is required so that the educator can adapt to the technology. The present system is adapted to the educator, not the other way around, and stands in the forefront because of instructor-assisted design criteria.

The system, as shown in FIG. 3, allows for introduction of additional third party medium materials into the classroom. These materials may include written words, pictures, videos or slides and portions of publications. More difficult-to-display materials such as three-dimensional objects, presentations, Internet pages and images from remote sites or other audio-visual medium may also be added to the lesson without any additional programming or interruption. These materials may be integrated into the lesson as another piece of data from a data source and may even be added to the database. Such educational materials are delivered into the classroom, integrated with the system and provide accelerated learning that automates information delivery and speeds up learning without pause, reset or delay. The system becomes a seamless, virtually automated, instructor-assisted technology operating in real-time mode.

The present method and the system for information delivery is composed of specific software designed for integrated teaching and of various off-the-shelf technologies, utilized as an integrated learning system. The equipment incorporated into the system, for example, include:

Processors such as Dell Dual-Processor Server with ST Software

Figure 4:
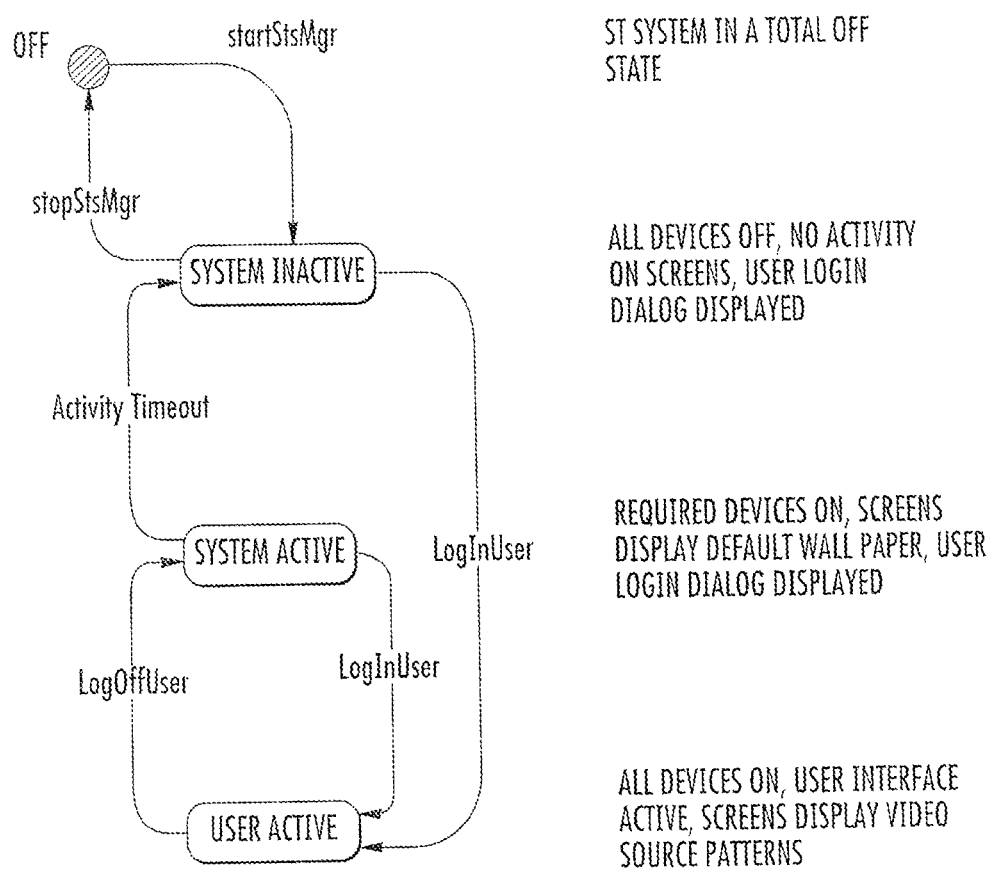
FIG. 4 shows a diagram of different states of the system during active and inactive periods.

Display components including three display screens such as Da-Lite 73650 motorized projection screen Display support, instructor robotic self-tracking cameras and student-sensitive tracking cameras such as Sony EVI-D100 pan-tilt camera, ICI WM30B camera mount, Sony VID-P110 document camera and document camera motion detector Annotation device such as Boeckeler annotation system PVI-44D Data sources such as JVC SR-365U VHS VCR, Pioneer DVD-V7400D DVD player, Pioneer 300 DVD changer DV-F07 and Contemporary Research 232-STA tuner/demodulator Video equipment such as AutoPatch 8Y-XL 24×48 composite video switcher, Zandar MX16 multiviewer, Extron SVS 100 seamless video switcher, Sanyo PLC-XP30 3000 Lumens LCD projector, Leitch 2204-2T dual TBC-IV, Antec TVAtor II scan converter and Viewcast Osprey 200 Video Capture Card Audio equipment, surround sound system and speakers such as Crown CM-31W60 ceiling microphones, EAW L8CX2X0 ceiling speaker, JBL Control 25 speaker, QSC CX 254 amplifier, Gentner XAP-800 digital echo canceller, Gentner PSR1212 digital signal processor and Atlas/Soundoller EQ818 speaker black box Support hardware such as Da-Lite interface controller, Polycom Codec VS4000 with PRI T1 interface, SurgeX SX2120 surge suppressor, Advantech PCI-1760 relay card, Cyclades Cyclom-YeP 32-port serial port unit and SurgeX SX20-NE surge suppressor Cabinets such as Middle Atlantic rack unit Instructor Station with touch screen monitor and stylus (providing graphical user interface) such as Elo 18" Intelli Touch, touch screen monitor Microphones such as Shure UC14/83 lavaliere wireless microphone and Shure UC24/58 handheld wireless microphone One instructor-operated overhead, self-focusing, industrial grade camera/overhead white board Cables and connectors DVD, video and cable interface Internet interface on high speed access Turning to FIG. 4, a diagram, showing different ON/OFF states of the system, provides different stages of standby and inactive modes. In an OFF state, the system is in a complete shut down state where power may also be cut off from the system. The system is started into an inactive mode in which all devices are off and no display on the screen may be present except for the user-login dialogue box. Upon successful completion of a login process, all devices are turned on, the user interface becomes active and the display screens show image patterns from a default video source. However, when the user logs off, the user is taken back to the system active mode, which either allows them to stay in the user interface inactive mode or login another time and cause the user interface to become active. In the system active mode, the required devices are on, the user login dialog box is displayed and the screens display default wallpaper images. A built-in timer measures the period of inactivity, and if it exceeds a certain limit, it automatically takes the system back into the inactive mode. From the inactive mode, the system manager could shut down the system in order to go into the OFF state or allow for further user login by displaying the user login dialog box.

Educators apply the present invention as an integrated single system to promote learning via the Internet, remote learning, cable, VCR, DVD, CD-ROM, computer software programs and via live in-classroom interactive media. Contrary to educational applications, where the system in the classroom is typically one monitor or TV set, the present invention delivers educational content via three display screens that vary images with video-wall-like effects in algorithmic patterns that enhance attention and retention. The software used in the system provides the steps for a method of information delivery via the main system by manipulating images displayed in the classroom.

The implemented software architecture is a rule-based system that includes a group of databases and sets of predetermined rules. A rule-based configuration relies on the set of rules that are programmed in a procedural computer language. Different sets of rules are determined and measured according to the results of brain-learning processes and how the optimum rules correspond to increased test scores for the students who benefited from the system. The software uses an auto-switching algorithm that follows the sequence and values obtained based on the rules applied to the content of a related database. For example, if the instructor selects the instructor camera, the algorithm causes activation and deactivation of a series of other sources. Some sources may be combined together or with other sources as secondary sources in the background to provide the displayed images. The conditions imposed by the applicable rules in the system software and the related databases determine particular display sequence, display duration and the combination of images on different areas of each screen.

The system starts up from OFF state to inactive mode and allows user login when dialogue box appears and allows login information to be inputted. The system is based on Windows®-based operating system and is configured for compatible graphical user interface for controlling the data sources. After successful login and entering user interface active state, default nodes such as the camera, VCR or microphone are activated and provide audio and visual information to be displayed on the screens. The system is based on a three-tier model which includes data/source layer, application layer and user interface layer. Databases and data sources are in the first layer and provide the content of displayed information and may include databases, audiovisual-data-source devices or remote sources.

Rule-based software controls the hierarchy and the sequence for displaying images from these sources of data. After the start-up stage, the data layer makes all servers check their corresponding registry to ensure that all devices are on and communicating properly. The middle application or meta layer operates the communication between user interface and data layer through corresponding servers. For example, in order to start the VCR and run the system, the application layer handles the logic according to the predetermined set of rules and communicates through the corresponding server the necessary control commands to the VCR. After the VCR is started, the application layer provides any feedback or status data received from the VCR to the user interface and/or the data layer.

At least portions of the invention are intended to be implemented on, or over, a network such as a LAN, WAN or the Internet in order to share the information or receive additional lessons to be combined with the one in session. The network connection may take place in order to share the lesson with a remote location or receive information and/or participate in interactive discussions with other classrooms. Alternatively, Internet users who are interested in the topic or require class attendance while being away, i.e., absent students and correspondence course participants may share the instructor in the classroom.

Figure 5:
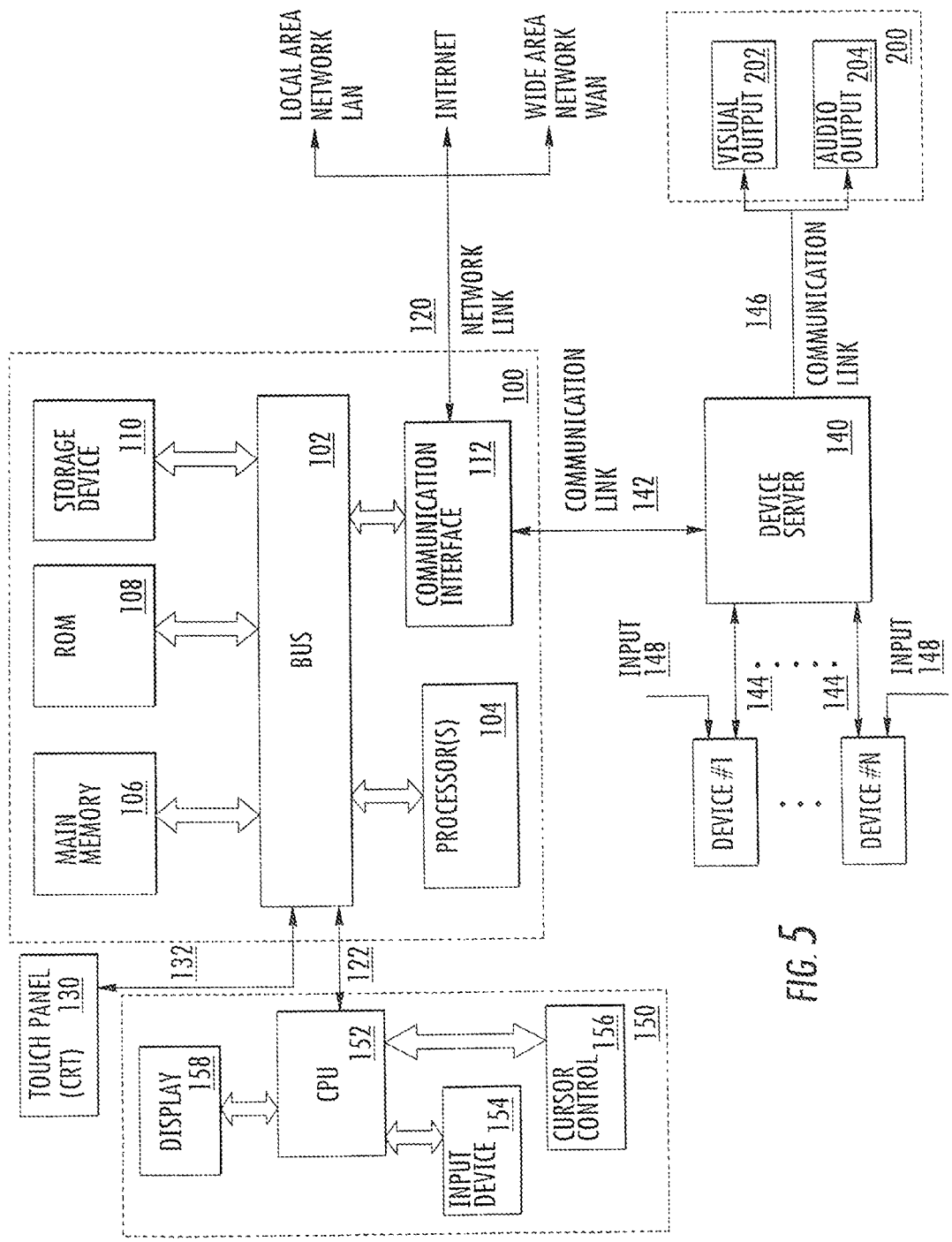
FIG. 5 shows a diagram of the computer system configured for performing the steps of information delivery method according to the invention.
Figure 6:
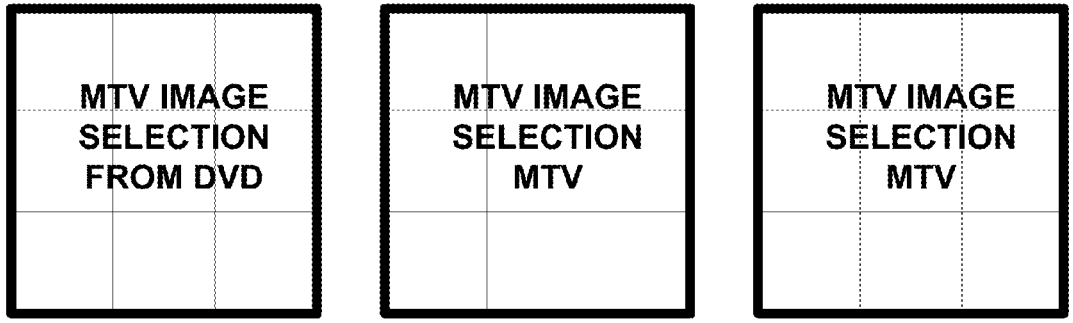
FIG. 6 depicts an exemplary display configuration before class starts, according to one embodiment.
Figure 7:
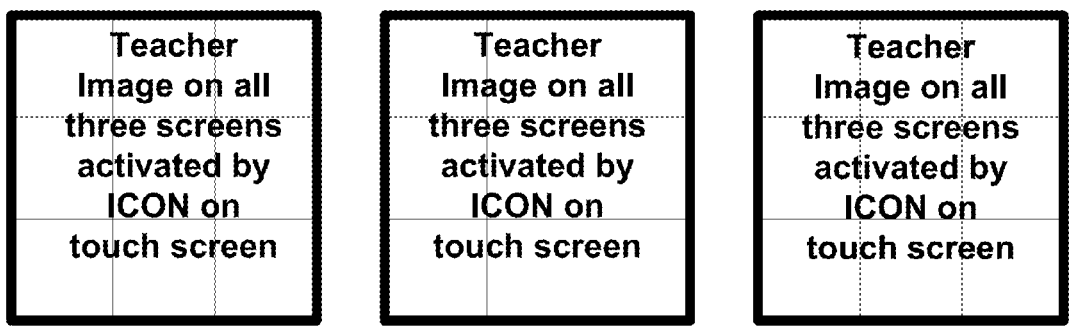
FIG. 7 depicts an exemplary display state immediately after class starts, according to one embodiment.
Figure 8:
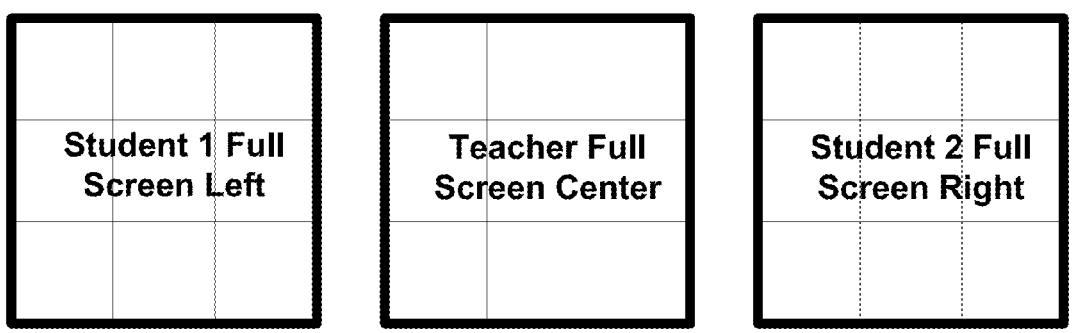
FIG. 8 depicts an exemplary display state with images of the teacher and students displayed, according to one embodiment.
Figure 9:
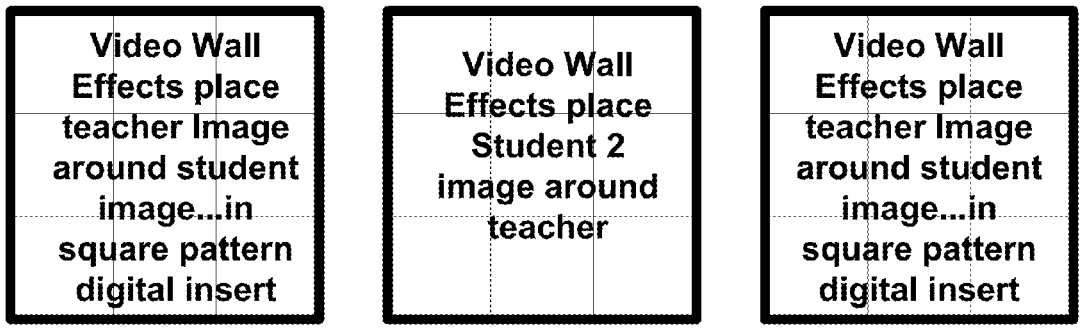
FIG. 9 depicts an exemplary display state with multiple images of the teacher and students on a single display, according to one embodiment
Figure 10:
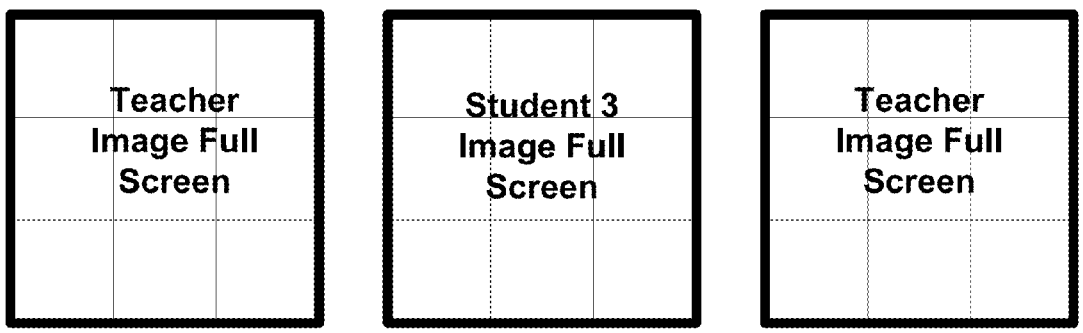
FIG. 10 depicts an exemplary display state showing images of a student and the teacher, according to one embodiment.

An example of such a network is described in FIG. 5 depicting a block diagram that illustrates the main server system as computer system 100 upon which an embodiment of the invention may be implemented. System 100 includes a bus 102 or other communication mechanism for communicating information, and one or more processor(s) 104 coupled with bus 102 for processing information. System 100 also includes a main memory 106, such as a random access memory (RAM) or other dynamic storage device, coupled to bus 102 for storing information and instructions to be executed by processor(s) 104. Main memory 106 may also be used for storing temporary variables or other intermediate information during execution of instructions to be executed by processor(s) 104. System 100 further includes a read only memory (ROM) 108 or other static storage device coupled to bus 102 for storing static information and instructions for processor(s) 104. Storage device 110, such as a magnetic disk or optical disk, is provided and coupled to bus 102 for storing information and instructions.

User interface at the instructor station is achieved through terminal 130 that provides a touch panel incorporating the control elements shown in the control panel of FIG. 2. The touch panel may be a cathode ray tube (CRT) or any other medium for display and input. Communication link 132 connects the touch panel to the main system through bus 102. Computer system 100 may be coupled via bus 102 and communication link 122 to personal computer (PC) 150 having display 158, such as a cathode ray tube (CRT), for displaying information to a PC user. Other output devices such as printers may be used for providing information to the user. PC 150 is used at the instruction station and may provide data as another data source device. It includes processor (CPU) 152 where an input device 154, equipped with alphanumeric and other keys, is coupled to PC 150 for communicating information and command selections to system 100. Other user input device is cursor control 156, which includes devices such as a mouse, a trackball, or cursor direction keys for communicating direction information and command selections to PC 150 and for controlling cursor movement on display 158. This input device typically has two degrees of freedom in two axes, a first axis (e.g., x) and a second axis (e.g., y), that allows the device to specify positions in a plane. The input device and cursor control support the graphical user interface on the display.

Main system 100 operates in response to processor(s) 104 executing one or more sequences of one or more instructions contained in main memory 106. Such instructions may be read into main memory 106 from another computer-readable medium, such as storage device 110. Execution of the sequences of instructions contained in main memory 106 causes processor(s) 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor(s) 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables; copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor(s) 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor(s) 104 retrieves and executes the instructions. The instructions received by main memory 106 may optionally be stored on storage device 110 either before or after execution by processor(s) 104.

System 100 also includes a communication interface 112 coupled to bus 102. Communication interface 112 provides two-way data communication coupling to device server 140 through communication link 142. A serial communication link, such as RS232 may be used for link 142, although other types of communication links can be used according to the specific data transfer configuration. Device server 140 communicates with data sources or devices #1 through #N, such as VCR, camera and microphone, etc. and receives feedback data from each device using communication links 144. Each device may be accessed through its direct input 148, which is usually the buttons and control panel associated with that particular device. Device server 140 transmits commands and data from the main system and the devices over communication link 146 to output 200. Same data is available for display on the monitor of instructor's station in the active source window, described in FIG. 2. Data from each device is controlled and modified according to the instructions in the software before delivery to the server for display on visual output 202 or broadcast on audio output 204. Device server 140 provides data, sequence and timing of information delivered to output 200 according to a set hierarchical scheme in the software instructions, instructor's input or any other active control features.

Additional links are made to network link 120 that is connected to a local network (LAN), a wide area network (WAN) or the Internet. For example, communication interface 112 may be an integrated services digital network (ISDN) card or a modem to provide a data communication connection to a corresponding type of telephone line. As another example, communication interface 112 may be a local area network (LAN) card to provide a data communication connection to a compatible LAN. Wireless links may also be implemented. In any such implementation, communication interface 112 sends and receives electrical, electromagnetic or optical signals that carry digital data streams representing various types of information. Network link 120 typically provides data communication through one or more networks to other data devices. All networks use electrical, electromagnetic or optical signals that carry digital data streams. The signals through the various networks and the signals on network link 120 and through communication interface 112, which carry the digital data to and from main computer system 100, are exemplary forms of carrier waves transporting the information.

Computer system 100 can send messages and receive data, including program code, through the network(s), network link 120 and communication interface 112. In the Internet example, a server might transmit a requested code for an application program through Internet, local network and communication interface 112. Processor(s) 104 may execute the received code as it is received, and/or stored in storage device 110, or other non-volatile storage for later execution. In this manner, computer system 100 may obtain application code in the form of a carrier wave.

Although the present invention has been described and illustrated in detail, it is clearly understood that the same is by way of illustration and example only and is not to be taken by way of limitation. One skilled in the art could also vary the design of the features described using known elements to accomplish what is described in this disclosure without departing from the principals that are described.

APPENDIX

Excerpts from U.S. Provisional Application No. 60/282,877, filed Apr. 11, 2001 by inventor Bernhard Dohrmann, entitled "ENHANCED APPARATUS AND METHOD FOR SUPER TEACHING."

The description of the invention that follows is exemplary. However, it should be clearly understood that the present invention may be practiced without the specific details described herein. Well known structures and devices are shown in block diagram form in order to avoid unnecessarily obscuring the present invention.

Super Teaching provides elevated concentration, increased retention, and improved test scores for students. The use of multimedia provides a pattern impossible to learn or anticipate, elevating expectancy such that the information leads the viewer, much as with a video game. Although the teacher provides no alteration to their delivery of information (hence zero retraining) the student involuntarily experiences elevated attention upon the subject matter during the duration of the learning assignment. Super Teaching is a whole brain learning system engaging right and left brain functions in the learning creating easier later information retrieval. The result leads researchers to conclude learning is both accelerated and deepened creating positive impact upon student test scores.

Super Teaching Design & Software Specifications

The Following Pattern Flow and FIGS. 6-19 Depict Models for Super Teaching Information Management (STIM) a proprietary protected concept of the International Learning Trust™. Readers are under tacit agreement to protect ILT™ trade secrets while making their review. Copy or redistribution of the enclosed information is specifically prohibited.

Super Teaching® Opens: Class begins system fires up. See FIGS. 6 and 7.

Teacher Activates Touch Icon: Teacher Image all three screens—ILT™ tables provide variables to mix and match images . . . software to preclude duplication of image pattern to minimum frequency . . . teacher overrides by touch screen. Input sources . . . student camera's, teacher camera, remote learning, DVD, CD, Computer, Cable, Internet, VHS, other.

ILT™ Patterns Via table (variable to table). See FIG. 8.

Image Deliveries are "special effect induced" with multiple effects mixed to table to move images with impact (wipes, swipes, folds, page turns etc.) See FIG. 9.

Digital Video Wall Effects table driven by software to time sequence into program of image movement to screen at variable time intervals.

Note: Student image does not remain on screen for more than ten seconds on average. DVD of nature scenes provides wall paper for transitions (implied by not shown . . . waterfalls . . . ocean scenes and licensed footage to ILT™ library). See FIG. 10.

Figure 11:
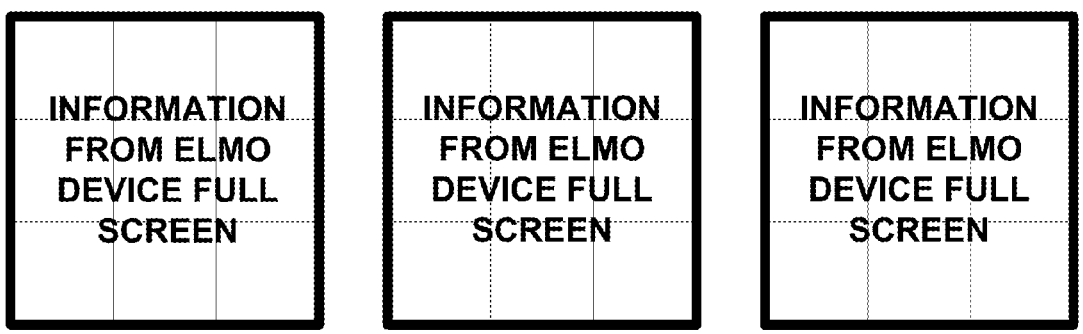
FIG. 11 is a depiction of an exemplary display state showing information from an ELMO device, according to one embodiment.
Figure 12:
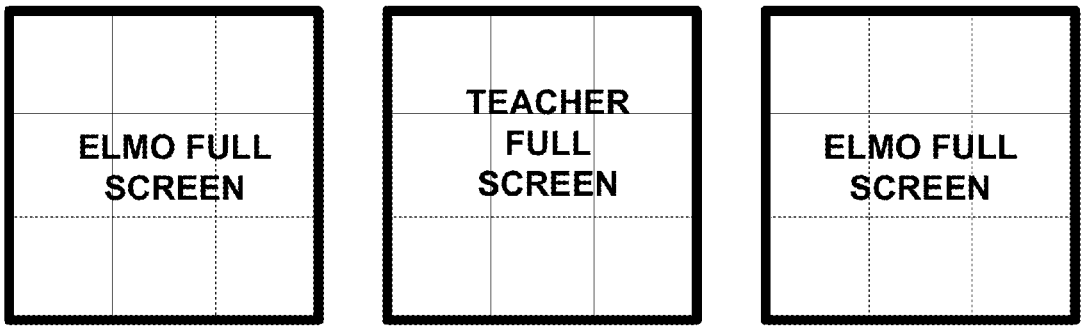
FIG. 12 is a depiction of an exemplary display state showing information from an ELMO device and a teacher image on the displays, according to one embodiment.
Figure 13:
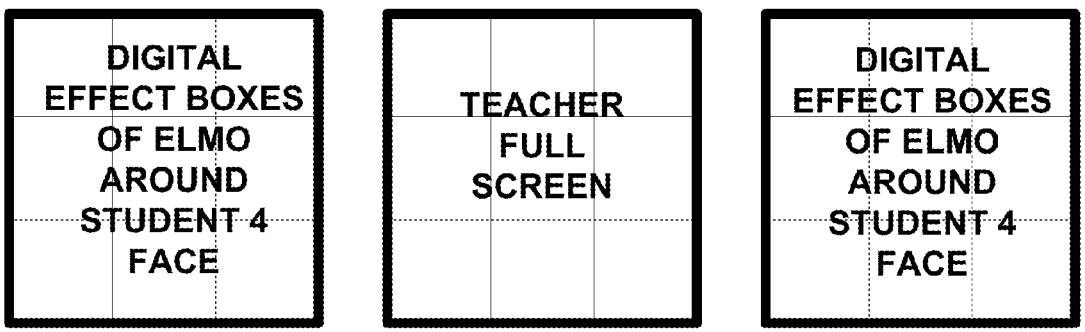
FIG. 13 is a depiction of an exemplary display state showing full screen image of a teacher on one display and combinations of ELMO information and student images on other displays, according to one embodiment.

With reference to FIG. 11, Sony Overhead Projector Information activated by touch screen icon, teacher induced and always results in first pattern of all three screens featuring information for variable table driven time patterns. If last image up, was three minute duration next image up may be 90 second duration before pattern shift. Teacher may optionally lock Overhead for extended VIDEO ICON to free all three screens on ELMO or on written information provided. See also FIGS. 12-13.

Figure 14:
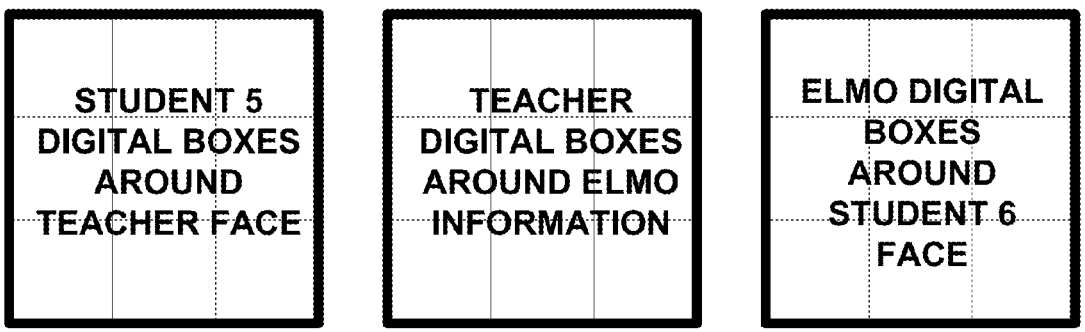
FIG. 14 is a depiction of a display state showing a combination of ELMO information, teacher images, and student images on the display, according to one embodiment.

With reference to FIG. 14, ELMO, Internet and Power-Point and related "data" supporting information to faculty instruction, is presented in moving, redundant patterns, which reintroduce and reinforce the "data points" with teacher and student interaction to the subject matter using media to compel higher attention, via automated technology assistance to create a "seamless teaching delivery system".

Figure 15:
FIG. 15 is a depiction of a display state showing a video from VHS or DVD, according to one embodiment.

With reference to FIG. 15, video from VHS, DVD, Cable or alternative input source, including USB, Disk Hard Drive, FIREWIRE, digital camera, etc. initiate via Teacher elective Touch Screen icon, wherein all three screens present video source material. Video Stop Icon overrides video input replacing table driven patterns always starting with Teacher or ELMO on all three screens at teacher election following VIDEO stop ICON.

Figure 16:
FIG. 16 is a depiction of a display state showing images from a remote location, according to one embodiment.

FIG. 16 depicts an Interactive Example: Teacher may elect ICON for REMOTE LEARNING FULL SCREEN, END REMOTE LEARNING, and election of ELMO or related collaboration (PowerPoint etc.) is sent to REMOTE system. Full Screen provides remote input including video and related images as sent on all three screens with interactivity per teacher election (voice pads, mike activation, other technology controllers.)

Figure 17:
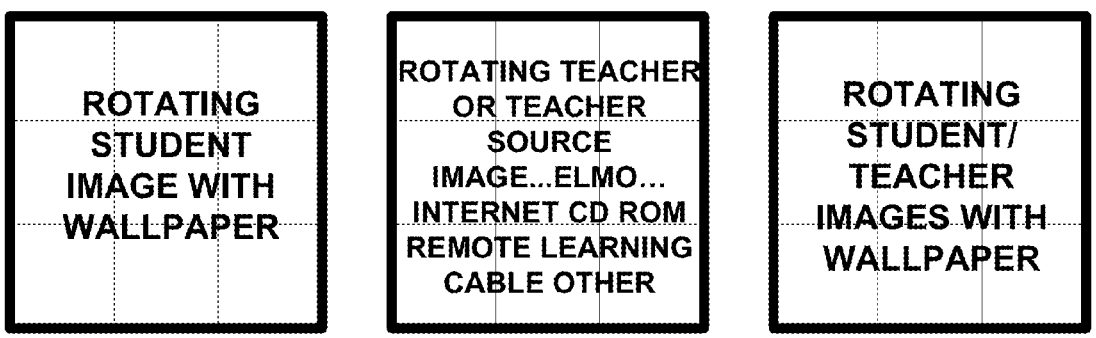
FIG. 17 is a depiction of a display state showing rotating images of students, wallpaper, the teacher, and information from an ELMO device, according to one embodiment.

With reference to FIG. 17, Super Teaching® rotates by default, using table driven time-outs or "what if s" to alternative images appearing on the screen at any time interval. Images may be overridden by instructor to place a single source image on all three screens in two modes. Mode 1 override provides a time out to again move images after variable default. System remembers previous time outs, and varies pattern to provide maximum alternatives. MASTER Mode 2 provides static image that will not rotate until instructor pushes Mode 1 icon.

System is designed to vary patterns, move data for redundancy, and involve teacher and students interactively to elevate concentration and retention. System draws from wall paper source (DVD video images of nature scenes from ILT™ library) and special effect library for presentation of camera and date images to screen.

It is envisioned control for the system will be an ILT™ technology, using some DASCOM Navigator resources licensed to the ILT™ and evolved proprietary resources shared by DASCOM and ILT™ as a DASCOM work for hire project. The ILT™ seeks to entertain bids from DASCOM to provide integration technology for the project on a confidential work for hire contract basis, with a proposed work for hire contract enclosed.

See FIG. 18 is a SAMPLE SUPER TEACHING® TABLE CODED TO SOFTWARE.

SUPER TEACHING® TRANSITIONS ARE DRIVEN BY SWITCHER LIKE EFFECTS ROTATIONAL TO TABLES, THAT SOFTWARE REMEMBERS AND APPLIES TO MAXIMIZE VARIABLE COMPONENT OF EFFECT TABLE. EFFECTS MAY BE ADDED AND TABLES ENLARGED AT ANYTIME WITH SOFTWARE HARDWARE UPGRADES.

With reference to FIG. 19, effects refer to Sony 500 or similar effect generations from switcher/software related controllers to the image pattern shifts with regard for more flawless operation of transitions between integration of input sources.

Frequently Asked Questions on Super Teaching

What is Super Teaching?

Super Teaching is a new technology that supports teaching (learning) in any classroom. Super Teaching includes high definition video walls, control units, input sources and automation creating a new POWER TEACHING technology for modern classroom application. Teachers employ their existing materials and notes in Super Teaching Classrooms. Students "attention" is riveted upon the subject matter in a Super Teaching Classroom. Students achieve superior comprehension from content taught with Super Teaching support. A greater percentage of Super Teaching students tend to achieve higher test scores. Hundreds of teachers have testimonialized Super Teaching as a key breakthrough for education.

What Retraining is Required for the Teacher?

Teachers are certified to apply Super Teaching in the classroom following a one-day training class. No new or special skills are required by the instructor. The Super Teaching Classroom is highly automated. Teacher transition from the conventional classroom to a new Super Teaching Classroom is seamless. Any teacher who can operate a remote control unit for a standard television set can apply Super Teaching technology in the classroom following a one-day training.

Who Invented Super Teaching?

A team of leading educators invented Super Teaching. Following years of research, the Super Teaching technology was first released for classroom application in 1994. In late 1994, the Department of Education of Hawaii became the first public school system to approve use of Super Teaching in public schools. A growing number of state, corporate, and national educational institutions are now reviewing approval plans for Super Teaching in their educational assignments. Super Teaching technologies are owned and promoted by the non-profit INTERNATIONAL LEARNING TRUST (ILT).

What is the International Learning Trust?

The International Learning Trust is a non-profit entity incorporated in Washington, D.C. The operating offices for the ILT are located at 200 Lime Quarry Road in Madison, Ala. The ILT was incorporated by James Burk, an Attorney at Law, practicing in Washington, D.C. The controlling board members for the ILT are Bernhard and Lynn Dohrmann of Huntsville, Ala., and Myrle Hill of Athens, Ala.

Why is Super Teaching a Breakthrough in Human Learning?

Super Teaching embraces the theory that storing and retrieving information via an "eye-ear-body sensory system" optimizes with a given medium of delivery. The cornerstone question becomes which medium is the ideal medium for an "eye-ear-body system"? For example, is the ideal learning medium a piece of chalk, a black board, and a live instructor, or a CD interactive computer, or a virtual-reality device, or one overhead and two monitors, or some other configuration? Super Teaching is a configuration of media plus controllers that automate the process of accelerated whole brain learning to its highest known form of efficiency. Super Teaching functions at high performance rates for student body sizes from ten to five hundred making the medium efficient. Super Teaching provides the ENDPOINT to the emerging information highway where it is needed most—in the learning institution.

What are Some of the Key Characteristics of Super Teaching?

Super Teaching delivers "any" curriculum with a maximum of left brain redundancies coupled to right brain images. Super Teaching creates dynamic information delivery that rivets the "attention" of student bodies in all age categories. Super Teaching excites both left and right brain hemispheres during the "entire" duration of the learning period. Super Teaching repeats and delivers information (measured in lines per minute) at a velocity nine times faster than conventional classrooms. Super Teaching develops superior retention of the information which for the majority of participating students has been tested to be three times higher than conventional classrooms. Teachers love to teach in the medium of Super Teaching. Students love to learn in the medium of Super Teaching.

What Relevance does Super Teaching have to the Emerging Information Highway?

Super Teaching is the "endpoint" for the Information Highway. Super Teaching provides a "distribution and display" of information that is "most" integrated to the learning modality of the human brain. Super Teaching permits one or multiple input sources of information into a seamless system of "absorbable" data for human retention. Driven by increasingly inexpensive, "smart", front-end controllers and explosive bandwidth interconnectivity capacity, Super Teaching Multiple Information Centers (MICs) become the ideal medium for the human delivery system on the information highway.

What is the Obsolescence Factor for Super Teaching?

Super Teaching presents a high-velocity, high-volume information delivery system for human application, a system that most ideally matches brainwave frequency. Exceeding the Super Teaching volume envelope by adding more display capacity or higher velocity creates retention breakdown. The "eye-ear-body" sensor system must evolve to new forms before making Super Teaching MICs (Multiple Information Centers) obsolete. Super Teaching accepts input from cable, wireless, PC, CD, video, overhead, or any emerging information technology and displays the data for maximum human "comprehension" and enjoyment. Once installed, Super Teaching systems become a lifetime ENDPOINT to the evolving information highway. Super Teaching is a permanent plant fixture for "any" classroom. As larger production of these systems reduce costs, home and office use of ENDPOINT technologies should also rise. Due to the relative absence of "obsolescence", investments in Super Teaching ENDPOINT technology has substantial significance.

What is the Cornerstone of ILT's Super Teaching Technology?

Super Teaching is a combination of software and hardware deployed in a highly automated, user-friendly system. Teachers who are computer illiterate can easily adapt and work with Super Teaching Endpoint Technologies. The premise begins with the notion that the most compelling "attention-management" device for human "eye-ear-body" systems is the high definition video wall. The multi-media video wall, when configured with left-center-and-right configuration, maximizes whole brain learning at accelerated levels. ILT's Super Teaching video wall system controls every pixel of data individually via unique hardware/software controllers. Students receive data from multiple input sources displayed in a single, seamless river of information that accommodates human differential learning.

What makes Super Teaching Unique?

A debate has been raging for some time related to "information" versus delivery of the information. Consider the notion, "But what can the method of delivery really mean to the value of the information?" In recent years, new studies have uncovered material related to how the brain receives and records information. PERHAPS THE SINGLE MOST SIGNIFICANT ISSUE IMPACTING HUMAN LEARNING CONCERNS THE ISSUE OF ATTENTION MANAGEMENT.

FOCUSED ATTENTION=LEARNING

If human attention is fragmented, results are fragmented. The rule for the developing communication age indicates information is relatively unimportant when the information is not communicated in the most dynamic manner. Super Teaching provides the MEDIUM for delivering educational information (of any form) to human beings in the most dynamic manner. Attention is highly focused during the entire learning period. Attention management effort is reduced. Human concentration on subject matter is elevated. No other medium form (all have been tested) provides equal stimulation toward higher learning performance gains in the classroom.

What is the Significance of Super Teaching to the Modern Classroom?

Every classroom in the world will become a Super Teaching Classroom. The permanence of the medium tied to the effectiveness of the medium compels educators to adopt the superior technology. However, at its optimum, Super Teaching is only one piece of a very complex pie. As a POWER TEACHING tool, Super Teaching provides value in riveting student body attention. Super Teaching provides value by permitting more efficient "team teaching" to larger student bodies. Super Teaching provides accelerated learning opportunities unmatched with other mediums. Super Teaching does not provide content or curriculum. Super Teaching supports but does not design sequence, content, or experiential training for the student. Super Teaching is the ENDPOINT in the classroom, home, or office for the Information Highway.

What is the Relationship of Super Teaching as a learning Method to the Personal Computer?

The personal computer is not a teaching tool. The personal computer is a "confirming" rather than a "learning" tool. Students have applied personal computers in the classroom for two decades. The results have been dismal. The best results in education are taking place with redesigned curriculum models that present intense learning periods with live instructors, juxtaposed to periods of interactive learning with computers or experiential exercise. If teaching is in part spiritual, with much of what is taking place occurring on a non-verbal level, then live mentors will be less effective on CD medium. If live instruction is to be applied (and only live instruction works), then SUPER TEACHING is the first new POWER TEACHING tool of its kind. In an age of media-conditioned children with higher self-talk speeds, concentration and attention management become the key aspects to classroom learning. One personal computer can educate an entire class with superior results, when supported by a live instructor in a Super Teaching Classroom. A class filled with cubicles and individual personal computers for each child (though the dream of personal computer sellers) has turned in twenty years of wrong direction and results that society cannot afford to repeat. Personal computer rooms have value. However, when live teachers instruct, nothing compares to SUPER TEACHING. Just ask any of the thousands of students or hundreds of teachers who have experienced the process.

What is the Difference in Results for PC-Based Learning and Super Teaching Education?

Since 1975 over 80 billion dollars has been invested by public schools to outfit classrooms with computer systems, networks, and learning support. During this period, test scores in these same classrooms have consistently fallen. PC activity in the classroom is shifting to a CONFIRMING role . . . computer-confirmed learning. Live instructors CREATE learning. PC classrooms of the future require massive retraining for the teacher and the student. Curriculum must be re-engineered for interactive CD application. Students learn from many non-verbal communications between mentor and student and from signals given student-to-student. These signals develop confidence, reinforcement, pride and a sense of achievement for a human being, that is best extended by live interaction in traditional classroom configurations rather than computerized work areas. Super Teaching operates on the premise that education is both "spiritual" as well as physical. In this context, a live spiritual being (teacher mentor) interacts with a classroom of students who are also spiritual beings. Non-verbal communication contributes significantly to the learning process, especially in the areas of transmitting a societies' standards and cultural information at any given time. This spiritual element may be impossible to transfer to a CD-ROM. Super Teaching presents data from CD-ROM and computer in a MEDIUM that is ideal when human "learning" and retention are at stake. Students learn MORE, learn BETTER, and learn FASTER in a Super Teaching Classroom than with any alternative technology.

Why does Super Teaching Provide Superior Test Results Over Other Forms of Information Delivery?

Super Teaching is more completely involving for human "eye-ear-body systems" than other mediums of information transfer. Super Teaching presents information in a manner that simultaneously and "most ideally" engages the senses including sight, smell, hearing, motor function, and emotion. Super Teaching is the ideal platform to empower teachers in rotation of "data transfer" supplemented by experiential exercise activity achieving accelerated human skill transfer. Super Teaching provides the missing elements to PC confirmation exercises such as student-to-student interaction that is engaging, emotional, and kinesthetic. Super Teaching provides opportunities for the most interactive classroom in the world, student-to-student, student-to-teacher, teacher-to-student, and all parties to the MEDIUM and information. Teachers love the technology. Students love the technology. Super Teaching most perfectly matches brainwave function for eye-ear-body sensory systems. Information is RECEIVED by the STUDENT in their most favorite learning form. A maximum of right and left brain redundancies for information delivered are system-produced so that far stronger impressions are consistently recorded by the student. Students learn more, learn faster, and learn with higher comprehension. The effort to instruct is reduced. The effort to pay attention is reduced. Everyone enjoys the learning process with a new "feeling" emotionally. This teacher/student emotional side-benefit may be among the most compelling assets working to revitalize education in the 21st Century. Super Teaching studies will continue for many years to detail why the performance gains continue to be so dramatic. The results are well-documented. Super Teaching WORKS!

How are Super Teaching Test Results Demonstrated?

The ILT has conducted approximately 2200 hours of educational test assignments to just over ten thousand students. The testing period began in 1988 and is ongoing. Approximately, every seven weeks demonstration classes for Super Teaching are presented in Southern California. Leading educators attend Super Teaching demonstration classes from all over the world. Conventional classrooms of all types presently report 22% to 33% of all students tested are achieving desirable comprehension for subject matter (C+ or higher grade standards). Super Teaching test scores provide elevated student performance so that 68% to as high as 77% of students, on the average (using conventional subjects), experience desirable subject comprehension. From 1993 forward, mixed student bodies of adults and children share live demonstration for perfected Super Teaching classes in Southern California. These live tests demonstrate challenging curriculum designed by the ILT known as the Free Enterprise Forum. The Super Teaching Demonstration course is a five-day intensive, accelerated skill transfer program. Program results are reported in writing by attending students on completion boards while the class is in session. Many professional educators are favorably impressed by the results they observe.

What Key Techniques are Used in a Super teaching Class?

Super Teaching classes involve as many senses and emotions as possible during the duration of the learning period. Super Teaching provides a velocity of information that more appropriately matches brain-wave activity. In a conventional class, the student is "self-talking" up to nine times faster than the information delivered by the talking-head instructor, with or without media support (such as an overhead). In a Super Teaching Classroom, information is reaching the student at six to nine times faster than conventional delivery. The content delivery is in effect accelerated. This process permits a weak impression made by the instructor when the student is "mind wandering" out of the classroom to be REPAIRED by a stronger impression on the same data point, via Super Teaching automated redundancy. The redundancy of a Super Teaching Classroom will reproduce each data point up to twelve times, creating a catch basin for strong impressions, equally benefiting left and right brain differential learners.

How is the Redundancy Developed in a Super Teaching Classroom?

Super Teaching creates redundancy for live-spoken information from an instructor or optional input source such as a video or CD-ROM. Super Teaching instructors are trained to prepare class notes for teaching as they normally would. Super Teaching instructors are trained to use IBI multi-million dollar image libraries from a prearranged three-ring binder that is bar-coded. By selecting image scenes and placing simple POST IT markers for the next day's lessons, teachers can enhance their redundancy pattern. Teachers present in the normal manner. The Super Teaching system takes information from the textbook, the overhead hand created notes), teacher notes (prepared and typed), illustration (text or teacher provided) and images (IBI IMAGE LIBRARY) for each paragraph of information. This data is automatically presented on the Super Teaching high definition, video wall screens. Animated sound byte sequences are consistently enriching the content. Teacher delivery is amplified through the Super Teaching sound system in each classroom. The information is presented via software controllers that preclude learning pattern styles for the information. Information may appear full screen, then repeat with teacher involvement, then with new information and still hold teacher involvement (visually) coupled to live class camera views placing the student IN THE PICTURE ... the effect is riveting to student attention. This medium, tested by the ILT study team, is the most compelling medium for holding the student's attention upon teacher content for the entire duration of the learning period. Various alternative forms of network PC systems, virtual reality systems, and multimedia systems were tested in the development of the SUPER TEACHING technology. Redundancy and whole brain involvement for the learner, impossible to match from conventional or alternative classroom designs, provide superior student retention, as well as test score performance gains. The results are immediate. The impact of Super Teaching affects a larger percentage of the student body than alternative learning technologies.

How does Super Teaching Work with Typical Learning Disorders?

More testing is required in this area before conclusive reports can be made. Early work with a wide range of learning disorders seems to prove that many of the disorders are actually "teaching disorders" rather than what would appear to be learning disorders. Years of work in this field thus far yield reports from dyslexics that their "conversion" obligation is removed as they experience near-normal learning conditions in a Super Teaching Classroom. Children labeled with various attention-deficit disorders find Super Teaching provides new comfort in holding concentration on the teacher-delivered topics. Teachers report the time they invest in ATTENTION MANAGEMENT is replaced with more rewarding focus on teaching art and content delivery. Many learning disorders appear to be diminished or obviated by the Super Teaching optimum for the "eye-ear-body" sensory system.

Has there been an Experience With Inner City Learners and Super Teaching?

Yes, however more work needs to be performed in this area. From 1991 through the present, the ILT has offered subsidy plans to INNER CITY youths (youths at risk) to attend Super Teaching Free Enterprise Training classes. At these demonstration classes, Inner City Youths report long-term results. Test scores following the program have risen by a full grade point average. Higher test scores continued after the Super Teaching Class. Many students have returned time and time again noting the Super Teaching learning experience helps them to focus, to concentrate and to learn. Teachers praise the Super Teaching technology in written reports and on video as the classroom of the Future for the inner city. The inner city requires Super Teaching to accelerate learning while holding student attention on the delivered content. No other alternative appears to match the ATTENTION MANAGEMENT advantages of Super Teaching in the modern classroom.

Why is Super Teaching a Superior Whole Brain Learning System?

Human beings are differential learners. Learning is conditioned from environment, biogenetic disposition, right or left brain propensity, and sustained teaching system exposure. Super Teaching elevates concentration while riveting attention. Super Teaching employs graphic and lineal data which are visual and auditory simultaneously. Super Teaching more compatibly matches the way the human brain works, and for this reason human beings find learning more appealing. Super Teaching is so compelling to the sensory storage system that old-pattern expectations for learning disappear and are replaced with REACTION to the Medium. Students report Super Teaching "feels" different. They report a new fascination with the experience of education from the Super Teaching technology. Super Teaching presents information with a feast of both left and right brain content. Therefore, the data is arriving to the students at all times in their MOST FAVORITE learning style (left or right brain). The result is less effort to focus attention on topic and greater duplication of stored data with deeper, more lasting impression value (retention).

What is the Impact of a Single Class Outfitted with Super Teaching on a Larger School System?

Super Teaching classrooms are ideally used by various teachers presenting a wide variety of subjects in larger school systems. One Super Teaching Classroom in a single school inspires learning system-wide. Students participating in Super Teaching classes also maintain greater concentration in other studies. Super Teaching elevates concentration for the student. It promotes cooperation often impossible in other classroom formats. Super Teaching is universally appealing to the student creating student demand for the technology. Demand from the student up, rather than from the teacher down, creates improved teacher/student relations. Parents and PTA/PTO groups love Super Teaching. Super Teaching classrooms represent one of the most dramatic demonstrations of shifting education from old models to the new. It is the ENDPOINT for the developing information highway. Super Teaching offers a twenty-year shelf life without unwanted obsolescence. It offers school administration more bang for fragile resources. Super Teaching is a resource that administrations can apply to develop new sources of funds based ON the fresh technology and its promise.

What are the Key Elements of the Super Teaching System?

The key elements of the Super Teaching System include laser-tracking, self-focusing camera. Three cameras typically outfit a classroom: camera number one focuses on the teacher; camera number two focuses on overhead images; camera number three focuses on the students.

Two video walls (three video walls in larger student body assignments) serve as the MEDIUM for lesson content delivery. A Bose® sound system delivers differential sound to the Super Teaching Classroom. A single component cabinet contains the controllers and driving input devices such as VCR, CD-ROM, laser disk, and other input device drivers such as closed circuit or cable input. A multi-million dollar software package provided to each classroom fully automates and integrates the components. A touch-screen computer on the teacher's desk provides opportunities to control all system features. A hand-held remote control also provides push-button control to the system. Teachers learn to work five ICONS on the computer screen by point and touch or to alternatively apply their hand-held controller.

Teacher retraining is NOT required to operate the Super Teaching system. They are instructed via a one-day demonstration class to put on a laser belt pack and mike unit and the classroom is ready to operate. One switch controls "all" technology making the automated program operational for all teachers—even to those who are most resistant to operate new technology. Once operational, POWER TEACHING appeals to most instructors as they gain immediate, new control over their classrooms.

From the Students' View How does Super Teaching Work?

Students walk into Super Teaching classrooms with music playing and images on the screen much like an MTV show. After 60 seconds or so, with all students present, the instructor pushes one button and his image flies onto the Super Teaching screens. His voice fills the classroom. At various times, the student's faces and images, highlighted by unlimited special effects, fly onto the screen around the teacher or onto a full screen. Information from teacher notes, newspapers, textbooks, or illustrations is put up by the teacher using a unique SUPER TEACHING overhead system. Information is always moving and flying around the video wall screens. The teacher operates in the THEATER of Education. The teacher is the star. The students are so conditioned to participate in this form of theater as an "audience" that many of the traditional class disorder problems disappear after Super Teaching is installed. Media conditioned student bodies adapt most naturally to the SUPER TEACHING medium of learning. Students see THEMSELVES in the Learning PICTURE day-by-day. The impact of involving the SELF-IMAGE creates higher concentration. The student's attention is led by the MEDIUM.

From the Teacher's Point of View What are the Key Attractions to Super Teaching?

Teachers first report value via the increased attention that students display. They next note higher test score results. Teachers immediately notice greater saturation for student comprehension through the larger percentage of ALL their students. POWER teachers substantially reduce ATTENTION MANAGEMENT responsibilities and invest greater effort on educational content delivery. A growing number of teachers are reporting "burn out". Many have left the teaching profession as a result. Super Teaching is exciting. It is a fresh new medium that EMPOWERS the TEACHER. As a POWER TEACHING TOOL, the educator receives an enormous boost in self-esteem, confidence, and enthusiasm as a system user. Teachers also appreciate the fact that they do not need retraining. They appreciate the full automation that makes the system uniquely user-friendly. Educators in many school systems nationwide, who have attended the ILT Demonstration Classes, are actively promoting installation of these systems in THEIR classrooms. Endorsements range from K through 12 grade to Post-Graduate Professorship. The appeal is universal. To date, 100% of the many hundreds of educators who have reviewed the monthly demonstration classes for Super Teaching in Southern California conclude the system is applicable for their classrooms. Teachers universally find the lack of reformation to their existing teaching style and methods appealing. They rate the short one-day training to adapt from convention to Super Teaching as ideal.

Are there Statistical Conclusions for Past Super Teaching Performance?

Super Teaching is nine times faster than conventional teaching, as measured by-lines, per-minute of content, delivered per hour in the average classroom. It increases the velocity of information reaching the student per hour and produces repetition and content redundancy in both left and right brain patterns. Weak impressions are upgraded to stronger impressions from this program of Super Teaching redundancy. Mind-wandering is reduced in classroom. Concentration is higher. Teachers find Super Teaching compatible and flexible for their needs. Super Teaching, on an average, produces a threefold gain in student retention. It provides greater flexibility to teachers in mixing information through various sources including cable, VCR, CD-ROM, laser disk, overhead, or virtually any form of text or image desired. Super Teaching is a POWER TEACHING tool that empowers the way information is delivered by live instructors to their students. Students tested, across all grade levels, report a substantial elevation in test scores on a wide variety of conventionally taught state curriculums. In memory subjects, such as history, test scores rose to as high as 77% to 88% of students achieving desirable grade standards. In cognitive subjects, such as math and problem-solving sciences, the test scores were slightly lower, but they were still impressive with up to 68% receiving desirable grades—versus 22% in conventional classrooms. In all other subjects such as social studies, which involve both problem-solving and memory aspects, test scores averaged in the low-to-high seventies achieving desirable grades—versus 33% from conventional learning.

Who Conducted the Test Training?

Super Teaching was developed by a leading team of educators. Team members include Dr. Lee Pulos, Dr. Mark Victor Hansen, Jack Canfield, LeLand Val Van de Wall, Chris Majer and Bernhard Dohrmann. Richard Greninger, the design engineer Microsoft® chose to help broadcast the release of WINDOWS® to the world, was retained to perfect the media configurations. Approximately half the team was Canadian. The U.S./Canadian development team worked for almost a decade to perfect the Super Teaching process. Special mention should also be made concerning the work of the late Alan G. Dohrmann, who pioneered the Super Teaching concept through 1983.

How is the Super Teaching Process Perfected?

Super Teaching is a proven system that delivers accelerated learning to students of all ages. Super Teaching is a POWER TEACHING tool designed to empower teachers in the classroom.

Super Teaching was perfected, over time, using live classrooms, double blind-studies, and thousands of students. Results of these tests were used to continually improve the teaching system. At a given point, adding media and system elements became counter-productive to student comprehension. The proven model with the most effective results became the adopted hardware and software configuration. The configuration of the medium effects student performance. The configuration is designed to accommodate the student body size. More media is required to manage attention of larger student bodies; less media is required to manage attention for smaller student bodies. A minimum, optimal configuration (shown in illustrations) creates consistent whole-brain learning involvement.

The five-year amortization cost for a single Super Teaching Classroom, used by many teachers and student subjects, is approximately $375 per student over the five-year period.

How is Super Teaching Protected in the Market?

Super Teaching is a proprietary technology. The Super Teaching technology is registered as a Trademark with the United States Trademark office. Additional copyright and related protections further enhance the exclusive nature of the product. Super Teaching includes unique hardware configurations, unique hardware, proprietary software, and prearranged educational image libraries. Approximately five million dollars has been invested in system research and development.

How does a School System Explore Contracting to Install a Super Teaching System as a Pilot Program in their School System?

A school system (public or private) usually reviews video and print materials about Super Teaching as a first step. After concluding Super Teaching had value to the in-place facility, a team of two to five individuals would be authorized to attend the ILT Demonstration Class. A tuition fee to cover program costs is required for this review process. Once the physical review process is complete the team would recommend moving forward.

The ILT will execute contracts to install Super Teaching on a non-profit basis. The local school system must develop private or corporate donors to provide funding for each classroom.

What is the cost of a Super Teaching Classroom Installation?

The cost to install Super Teaching in one classroom varies with classroom size. The average pilot plant installation is approximately $500,000. Costs lower as additional installations are planned. Per-student costs lower as more classrooms are brought on-line. The initial cost includes hardware and software, as well as all training and maintenance of the system for three years. Over a five-year period, the average school system using such a classroom could expect a cost of $375 per child—expressed on a sixty-month basis. Although the system is portable and can be relocated with minimal cost, Super Teaching is a brick and mortar item. The typical Super Teaching Classroom will outlast the physical facility into which it is placed and will be used over its lifetime by many teachers and student bodies. Typically, corporate sponsors and donor groups pay the cost of installing the system. ILT will assist in using Super Teaching authorizations as a FUND-RAISING opportunity for the approving school system.

How do Donors Participate?

Corporate and private donors support Super Teaching by investing in the future of high quality, accelerated education for our children. Nothing is more important to our way of life than to upgrade the education of our children. Corporate and private donors, typically hosted by participating school systems, create annual investments to the ILT. Each investment is a non-profit donation. Each dollar invested is in effect a transfer for the donor of a tax obligation to education. Donors may advertise their company identity in the classroom using space provided by the ILT. Such displays are tasteful and in keeping with the educational mission. The partnership of private and public sectors brings the mission of education (the service) closer to its customers (employers who hire the better educated). Super Teaching creates the ATTITUDE that employers are looking for in society by fostering respect for achievement. Nothing says more about the American Dream than the COMMUNICATION-AGE CLASSROOM that is in itself the ultimate ENDPOINT statement for the information Super Highway.

How is the ILT Organized?

The International Learning Trust (ILT) is a non-profit 501-C corporation, incorporated in Washington, D.C. The original development work for Super Teaching was completed by the ILT affiliate, Income Builders International (IBI) of Huntsville, Ala. IBI is a professional training organization that specializes in working with Fortune Company training assignments. Once Super Teaching was perfected, the rights to technology were gifted by IBI to the ILT affiliate. The ILT operates on the following mission:

ILT MISSION STATEMENT: The ILT is organized to install, as rapidly as possible, Super Teaching technologies in every possible classroom in every possible country in the world. The ILT seeks to enlarge human potentiality through accelerated learning via Super Teaching as the optimum "eye-ear-body" information transfer system.

The ILT is continuously seeking funds from private and corporate donors as well as grants from institutional sponsors. All funds are applied to classroom installations. Children and classrooms are now waiting for more funds. Your donations make a HUGE difference in the speed with which outfitting classrooms can take form. Please rush your pledges using the ILT Pledge Kit made available by those who provided this report to your location.

What is the Mission Statement for IBI?

IBI MISSION STATEMENT: IBI seeks to bring Super Teaching technologies to the Corporate Training Centers of the world through regular demonstration classes to the general public. IBI seeks to draw attention to the benefits of Super Teaching by reforming the workplace through skills training and education. IBI is a not-for-profit company. IBI owns an exclusive ILT license to market Super Teaching to Corporate Training and special mission demonstration classes worldwide.

How can the Reader Assist in Bringing Super Teaching to the Classroom?

Typically, the decision to bring Super Teaching to the classroom is made by State Superintendents of various school districts and the Board of Trustees for school systems. This takes time. Introduction of Super Teaching to these authorities is appreciated. References are included in the ILT Super Teaching materials which will be furnished to the educator.

What other Assignments are in the Works for Super Teaching?

While the primary mission is to place Super Teaching into the classroom, other projects are also underway. A diligent effort to install Super Teaching in military training centers is under development by retired military authorities and trainers who have substantial experience with Super Teaching. Additional work in developing Super Teaching for special assignments in training includes task forces from Chamber of Commerce groups and from other institutional applications who spot application value for Super Teaching. The Chamber of Commerce for Honolulu is working with IBI to create a Convention Center outfitted with Super Teaching. The idea is to attract more corporate convention business to Honolulu using the appeal of Super Teaching as a unique training asset.

How can I Attend a Super Teaching Demonstration Class?

Any member of the general public, including school teachers, can enroll to attend a Super Teaching Training Class. These classes are held in Southern California approximately every seven weeks. The individual who provided this report to you can also provide an Enrollment Form to the NEXT live Super Teaching Demonstration Class. Tuition costs may be reduced for authorized monitoring teams from accredited educational organizations (letters of authority required) and/or for corporate review teams from corporations that employ 5,000 or more individuals.

What is Taught at the Super Teaching Demonstration Class?

The live demonstration class teaches a multi-million dollar curriculum known as the FREE ENTERPRISE FORUM. The class is a five-day experience commencing on Tuesday and continuing through Saturday. Students from all walks of life and from many countries attend a typical class. The rich and famous enjoy the experience alongside those just starting out in business. Everyone learns new skill in developing strategies for MULTIPLE INCOME TECHNOLOGY (MIT) in the 1990's. Most students adopt a new income source during the class instruction. Care is taken that new financial sources may not conflict in any way with the existing Primary Source (J.O.B.) of income of the individual attending. Results are measured in financial terms and reported on completion tracking cards while each Super Teaching class is being instructed. Thousands of favorable reports have been recorded on video and in print from these demonstration classes. Each Super Teaching class provides a proof-positive demonstration concerning the application of the learning medium upon the student body. Results are measured and reported. Educators universally find Super Teaching an important tool in their future planning.

What is the Cost to Attend the Super Teaching Demonstration Class?

Super Teaching is presented so that each student pays his/her actual hard cost to attend. The tax-deductible tuition for the five-day demonstration class is $4500. Discounts for second family members may be available. Authorized educators who are reviewing Super Teaching for school systems (that have NOT YET approved Super Teaching) may be subsidized with a reduced tuition's for the official monitoring team. There are no scholarships as each student is paying the hard cost of producing the training. Meals are included in the tuition. Hotel accommodations and transportation are not included.

Why can't the Schools pay for this Technology?

School systems are having problems making payroll. There are no funds available for the needed reforms. Time is the enemy. A generation of Americans is reaching the street who cannot read. Immediate elevation to the existing teaching process is desirable. Super Teaching is one answer that can quickly improve results with minimal change to the existing teaching environment. Super Teaching is a proven technology. There is only one missing ingredient, MONEY.

What makes Super Teaching so Universally Appealing?

Super Teaching is universally appealing for many reasons. The foremost reason is the simple reality that Super Teaching WORKS! It requires minimum change to the existing educational plant. Super teaching requires minimum retraining for teachers who use the system. It is funded by outside contributions making the asset an off-budget item for school systems. Students and teachers love Super Teaching. Parents and administrators are proud to contribute Super Teaching to their systems.

Can you Summarize Super Teaching for those of us Who are Just Becoming Familiar with the Process?

Many thousands of students are going through Super Teaching classrooms regularly. Human beings have two characteristics when they learn something in a superior manner:
 1. They know the subject upon completion;
 2. They KNOW (are fully aware) that . . . they KNOW it (the subject material).

It is this second item of deep learning that is most dynamic. Self-esteem and self-confidence explode when the feeling of 'KNOWING YOU KNOW' is higher in the classroom. Super Teaching delivers a larger slice of the pie. A larger percentage of children 'KNOW THEY KNOW' the subject matter. Their teachers 'KNOW THEY KNOW' which fuels POWER TEACHING at a core that is difficult to duplicate. Super Teaching is the SHIFT for which everyone has been waiting. Educators who have experienced Super Teaching most commonly report that 'they now have HOPE." They have seen the future possibilities.

Super Teaching may be the most promising system to TEACH the world's children how to live on the planet under one roof; under God; in a manner that spawns achievement rather than conflict; and breeds abundance rather than scarcity. Super Teaching may ultimately be the SHIFT that brings PEACE on earth with a new focus on what is ALIKE rather than different about human beings. Our hope is Super Teaching will help to foster Free Enterprise capitalism as a 21st Century global healing force for family, community, workplace and society.

The work that needs to be done is immediate. The children cannot wait. Your help to accelerate results is appreciated. The next step for first-time readers is to attend the next demonstration class. Your creative resources join a team of planners and dreamers working on bringing this gift to the world.

Super Teaching Specifications & Software Developer Manuals Spring 2001

The ILT Super Teaching System

The following defines various pattern criteria for software design teams working on the Super Teaching Project. All design information contained in this booklet is deemed confidential and a trade secret of the International Learning Trust Inc.

The ILT Super Teaching System

Givens:

The following provide "givens" as assumptions for software engineers contracted to create ST IDS (Information Delivery Systems) design and tables (algorithms) for ILT Information Delivery System (IDS) systems. The following assumptions direct the Super Teaching Design team related to issues of integrated technology such that a three screen, ELMO or document camera, information like system, internet and remote learning, additional input sources, and teacher plus student robo camera's are applied in any configuration or deviation, for the purpose of classroom accelerated learning. All such applications are proprietary to the ILT when three screens and variable classroom input patterns are switched screen to screen for purposes of accelerating or enhancing human learning, via patent.

ELMO or DOCUMENT CAMERA (Always with Annotation Provided)

It is a given that when information is presented on an ST classroom ELMO or document camera the information is placed on all three screens, such that a software (table) resident computer memory is created to effect a transition from the All three screen HOLD for the document camera information, switching to a pattern variation that will not repeat in the near term, using variations of video wall effects and classic screen to screen hard cut switching of the image sources via ST IDS software. Future ST software should further extend the variations to 20, 30, 50 and up to 100 pattern types and more all table controlled.

A touch icon on the ILT IDS (Information Delivery System) Monitor will permit the teacher to Freeze the ELMO or Doc Camera device into a fixed five minute hold pattern on all three screens, prior to any pattern variation set forth in given #1 above. Such a lock will default to pattern program control in five minutes. Clear Titling such as ELMO or Doc Camera logo item on the main IDS Monitor screen.

A touch ICON on the ILT IDS Monitor will permit the teacher to FREE THE ELMO/DOC CAMERA DEVICE as a toggle to ON or move to PATTERN when released at the Teacher's option. When the ELMO ICON TOGGLE is selected a first time (ON) the ELMO information stays on all three screens an pattern software control is delayed. When the ELMO toggle is selected a second time (off) position, the ELMO all three screen image transitions into pattern types via software design, until the ELMO is next used either by motion sensor, ELMO 5 MIN, or ELMO TOGGLE or a combination.

Teacher Freeze

Teacher 5 MIN will freeze the live teacher on all three screens for five minutes. No other pattern sequence will take place during a Teacher Freeze which automatically will revert to pattern sequence, noting memory to avoid duplication of prior pattern, will initiate the next sequence in patterns. Patterns refer to the teacher image, surrounded by student images, or vice versa, or the sequence of moving student and teacher camera images to various screen positions.

Teacher FREEZE TOGGLE will provide a timeless toggle (ON) or Toggle (OFF) to the teacher image on all three screens. Teachers may defeat an ON TOGGLE automatically by selecting any other ICON such as ELMO or VIDEO or DVD at which time the DVD or the ELMO or any other combination of choices will place all three screens at the disposal of the selected input function.

Remote Learning Icon

The Remote Learning ICON will initiate a standard default pattern of having the center screen default to the home room and images of remote locations appear on the outboard screens. This pattern is not altered until the teacher hits another selection icon or toggles remote learning off.

Faculty would have an option ICON to move information to one screen, remote room to another and the local screen to another. All information would have an annotation capacity in the ST Remote Learning System.

NOTE: System always defaults to WALL PAPER DVD (nature scenes) when timed out or moved to an OFF position by the toggle of a prime ICON.

DVD/CD/VHS Toggle

ICONS to permit Teachers to operate DVD clips, stills or CD clips or stills, or VHS video's can do so by ICON with the technology selected running All three screens display input from the selected device until another ICON is selected or the toggle is turned off by the instructor.

Nature DVD

Teacher may at anytime toggle nature scenes to override all three screens until the Toggle is replaced by another ICON.

Super Teaching Standard Icon

The ST STANDARD ICON provides a pattern mix of students, and teacher, information and wall paper (nature scenes) and may be used to override DOC/CAMERA at anytime (ELMO will be included in pattern type if most recent all three screen image by ICON) . . . previous ST pattern is remembered.

Software Upgrades

Software Upgrades will add features and ICONS to the system from time to time.

General Detail in Table Design: Table 1

The Table one manages primary images that include:
teacher on all three screens;
information on all three screens;
teacher on one screen information on two screens; teacher on two screens information on one screen;
teacher on one or more screens with or without pattern;
information on one or more screens with or without pattern;
wall Paper in all configurations (nature scenes) triggering right brain involvement.

Table II controls effects upon images where Table 1 controls TIME for the appearance of any image on a screen before the image will MOVE or be SWITCHED.

Table Number 1:

PRIMARY TABLE—TABLE 1—TIME and PRIMARY IMAGE VARIATION

Table number one, controls the issues of launch givens for:
Teacher Icon Push to initiate Faculty Instruction
DVD
VIDEO
INTERNET
POWER POINT
CD ROM
COMPUTER PRESENTATION When a teacher selects INFORMATION for content to the Super Teaching INFORMATION DELIVERY SYSTEM or IDS all three screens are activated. In the case of the internet, delivery of information will default such that a 3 minute maximum one page all three screen display, will be allowed. The table will file and remember when the video or related presentation is completed, by software design, or when a page as reached a default memory algorithm position, to create ST PATTERNS moving faculty, students and ELMO or document camera information, onto the screens. Annotations will always remain on the screen until rotated such that the information will appear multiple times noting that a default MAXIMUM number of impressions (movements and redundancies for any single item of information) may be created by the system (nine). When the maximum default occurs, such that the nine variations of the information on the various screens have been manipulated to include table positions for:
Information around faculty member
Information around students; information full screen
Information in split patterns but still full screen
Faculty member around information
Student image around information
Variations of the forgoing for maximum impact Timing for variations is remembered by the system such that the combination of movements is varied, so that student learners have challenges to every predicting the pattern variables. Making it difficult to predict the pattern is a key element of the ST design.

Table one is a master controller for the key icons envisioned for the system to include on the opening interface:
ST FACULTY STANDARD=All Three Screens Faculty Image (Default to Pattern in normal time) (1)
ST FACULTY FIXED THREE=(All three screens faculty image for three minutes than default to ST Pattern table controller)
ST FACULTY FIXED FIVE=(All Three Screens faculty image for five minutes than default to St Pattern Table Controller)
ST FACULTY OVERRIDE=(All three screens faculty image never defaults to ST PATTERN)
ST DOC CAMERA STANDARD=All Three Screens document image will return anytime an annotation is made to all three screens—with memory and table driven control patterns (2)
ST DOC CAMERA FIXED THREE=Doc Image up on all three screens without regard for annotation for three minutes ST DOC CAMERA FIXED FIVE=DOC Image up on all three screens without regard for annotation for five minutes ST DOC CAMERA OVERRIDE=Doc image up on all three screens with no default to ST PATTERN from table controller

ST VIDEO CONTROLLER ICON (3)

ST DVD CONTROLLER ICON (4)

ST NET=SPECIAL ST NAVIGATION URL HOME PAGE ICON (for live classrooms). (5)

INFORMATION RESOURCE LIBRARY ICON (option) (click to stored system information when institution has access to same) (6)

ST CABLE (7)

ST REMOTE LEARNING (8)

ST PRESETS (9); ST EMAIL (10)

ST POWER POINT (11)

ST WORD (12)

WALL PAPER ICON=nature images on all three screens with or without sound used primarily for writing assignments—typically a six hour DVD of nature images with meditative music provided from ILT.

The ST master control panel (main screen) envisions a design with 12 PRIMARY ICONS supported by sub (pull down) icons for each category.

Software Designers would design the main screen to expand over time by allowing for up to 20 Primary Icons with up to 10 pull down screen menu options noting only those DESIGNATED will show on the main screen. This design permits expansion over time for information delivery of items such as BLUETOOTH and related technologies now emerging.

Choices for image on each icon would be clear, visual and easily supporting the content making it relatively easy to operate the system in any language. System design should be easily translated to any major language group for installation in the global village anywhere anytime.

The ST System is designed to run on an ST 2000 backbone and successive operating systems to remain upgraded and state of the art. Future system upgrades would be provided to schools without charge for the ST system, and with a charge for license upgrades per the license provider such as Microsoft for each upgrade or installation. A joint venture between ICI and ST Productions via ST MAINTENANCE CORPORATION would provide ongoing maintenance support for each ST installation.

SST SUB CONTROLLER SCREENS—PULL DOWN MENU'S

The St Sub Controller Screens such as DVD or VIDEO represent larger than customary control screens, providing very large image and typefaces for full screen easy viewing. Mouse control over fast forward and rewind for edit purposes would allow easy scan and location of information.

ST controllers envisions OPTIONS for the ST ADVANCED rather than ST BASIC system, that would permit video edit functions, such that a click on time could pre set TIME CODE "look ups" with TITLE OPTIONS provided by faculty, and these tables of "look ups" to specific video could be filed, retained and used again and again for a single video or multiple video or DVD image library.

It is envisioned hardware choices made for multimedia and related faculty call up will be fast, with maximum storage provided to each site location, via tower units with multiple drives at 100 gig drives and up. Automated back up routines would maintain libraries. The system would recommend automatically disk upgrades, replacement and maintenance as a software feature to ST MAINTENANCE (a joint venture of ICI and ST Productions).

Pull down menus would permit customary system adaptation, using tools that are industry standard and familiar to faculty who use computers. Faculty who do not use computers would have minimum training as most of the major elements are controlled from a single interface on the main screen that appears upon system boot up.

Table Number II

ST Table II is envisioned as an effect control system. The effect control system remembers patterns and alternates patterns to produce "unlearnable" image management on the ST IDS (Information Delivery System).

Table II produces variations that include from primary image variation . . . effects upon such images hard cut and "switched" screen to screen. Where Table 1 controls TIME, Table II controls effects and time:

Teacher on all three screens

Information on all three screens

Teacher on one screen information on two screens

Teacher on two screens information on one screen

Teacher on one or more screens with or without pattern

Information on one or more screens with or without pattern

Wall Paper All Options=Nature Scenes for whole brain learning ©ILT2001

Pattern variation seeks to move information approximately every 30 seconds, for random periods, and then to slow the information delivery movement down, for periods of three minutes maximum, and then to speed the movement pattern up again.

ST patterning seeks to have the Teacher appear on one or more screens, virtually all the time when Doc Camera information and annotation is being displayed, and immediately on all three screens when video or power point presentations are completed.

To the extent programming can KNOW when the last slide in a power point series is presented the system would default to ST STANDARD pattern by default.

Table II will control video wall effects such that memory would dictate variations to provide virtually unlimited possibilities and variations such that predicting pattern type becomes virtually impossible for the viewer.

Wall Paper—Nature Scenes

Libraries of wall paper or nature footage scenes will be provided for usage during class time. Wall Paper may be used by the system:

Image only for transitions and whole brain learning

All three screens with no sound at faculty option

All three screens with sound for writing and problem resolving exercises

Music will be baroque 16 cadence super learning proven learning assist selections or similar meditative non distractive learning sounds coupled to the DVD libraries of ST Provided Wall Paper Table III—Transition Tables Table III would control transition tables. Transition tables would deliver any image change with a wipe, or effect, transition from software libraries and pre builds. Table III may be a feature add on to ST ADVANCED. Table III will be a design application integration for software origination such that Table III will control effect transitions, if and as available. Transition libraries should be designed for cross software platforms and very deep data base control. Over time the transition library should be increased to expand additional industry developments as a matter of design. Transition software will be operated like plug ins, with table database control over the program and available. Specifications to allow for specific default speed to load and transact any transition effect will dictate the selection criteria for including a "plug in" to the transition library.

Data Base Management

Software development for the table controls for patterns and image on all three ST Screens, require a seamless, elegant software management. The database management (off the shelf) software chosen, while comfortable for the programmer experience, needs by selection to be a core engine that will handshake with everything.

Should the system jam, an auto-reboot timer should rapidly reboot the system, while a placeholder image such as SUPER TEACHING CLASSROOM appears on the screen.

Super Teaching Color schemes can match the industry standard of the ICI CRS system.

Reliability of the database management system is a key decision to system design.

Remote Maintenance and Trouble Shooting

All system modules and maintenance should be designed for remote software and hardware diagnostics, upgrades and repair by design. Automated system checks via online to log reports should provide dailies to ST MAINTENANCE on all systems in classroom operation. Customer Service phone calls related to any problem system should be made within 72 minutes of business opening daily, to institutions suffering any "ST problem event". All ST PROBLEM EVENTS should be documented to log as to each institution interface, either on phone or on line, providing a full document log for history to each system, system by system. The system maintenance log will provide design reference to repetitive EVENTS requiring a system modification to correct.

System automated maintenance software will "know" when a system is "in use" and poll such system until the system is off line and in a maintenance ready mode. Maintenance will be aborted should a system in maintenance be "taken over" by a live operator on site. A Maintenance operator can take a system over, and leave a message CLOSED FOR MAINTENANCE such that a live operator may have mouse and local input devices disabled . . . even shutting the system power down and rebooting will return the system to its last saved maintenance in progress function when control is in ST Production control.

Remote Learning

Each ST classroom is designed for full remote learning capacity. In classrooms without high speed bandwidth access the remote learning feature, though part of the software, is in effect an option. ST does not provide high bandwidth to the classrooms. Each school wishing to operate the ST REMOTE LEARNING FEATURE need only deliver high bandwidth to the "router access point" designed into each system to open the remote learning feature.

If the REMOTE LEARNING feature is disabled a menu reminder of same will appear when the ICON is accessed.

If the REMOTE Learning Feature is active the system main control screen will show up to provide full remote learning features to the faculty operator.

Amplified Sound

Each classroom will have amplified sound. Designs will vary classroom to classroom. Generally ceiling mikes will provide coverage to students. Mute features optional to the teacher, via a pad/switch on the faculty desk and via software (whichever is easier) will enable faculty to toggle their own mike off and on, as well as student mikes off and on.

Generally four overhead surround sound speakers will be mounted in the ceilings for best distribution for each room, with mild sub woofers filters for movie and drama items. A software (off the shelf) sound control system can switch and mix sound to the faculty taste and hold in pre sets such levels as faculty seeks for their boot up.

In all such pre sets a STANDARD BOOT UP for each Faculty Member (up to 100 should be provided for by design) create a virtual TABLE IV. Table IV enables faculty to set their initial room look and sound levels, such that a camera is on the clock or on the faculty member or on a preset location on boot up. Further sound levels and screen backgrounds can be selected from a library. Typically an MTV like music video is playing as a default to class start up, or any default music item (VHS or DVD the faculty selects) until the Faculty takes over room control to instruct.

Faculty should have easy access to lower or raise volume for themselves or a student as needed with a click. Volume control may remain in a menu bar as a tool item for easy in faculty adjustment anytime . . . seizing the LEARNING MOMENT.

A hard mechanical mini switcher permits the faculty member to simply reach over their desk to control the volume and eq and woofers as they desire, noting sound routing is software fixed such that any input source is the live source for sound, as designated by the ST IDS selection.

The result is an EASY REACH and EASY CONTROL system for faculty lacking technical skill. Also faculty should not be trapped to the computer screen but FREE to walk around and interact in the classroom.

Feedback with faculty in the zone of the live mikes for students must be a conflict resolution for each physical space design.

Light Management Systems

Generally simple mechanical light management systems will control light for the ST system. The Advanced ST version will have light management, such that video display will move light levels down. Further teachers may control light levels and adjust them like sound volume levels, via tool bar, in the advanced model. Outside curtain control of light will be generally physical by faculty drape adjustment. Blinds may be defined and installed for such purposes by the ST installation team. Light Management is a system option and is bid to each school system as such.

Institution Reporting

Institutions will have HOT LINES to report any system needs required on a local basis. Reporting may be made by phone or by email or by live chat request on YAHOO MESSENGER. ST Maintenance personnel will be on YAHOO during working hours providing instant technical help as required. Operational remote learning classrooms can also access technical support through remote and dial up to presets established in the software design for this purpose.

Software Design Upgrade Requests

The ST Help System will be a complete user manual on the use and operation of ST. The ST Help Menu will have pull down features to include an online Form for input by faculty for upgrades they would most like to see in the future designs under the heading FACULTY FEEDBACK. The Help Menus will become the basic lesson plan for a self help tutorial and live training for use of the ILT Super Teaching system in any language.

Automatic Upgrades will be a feature of the system, which will poll to seek new upgrades and download them (with faculty approval) or automatically when system is on after hours. System may be polled for wake up to install upgrades at anytime via batch job command.

System Security

Industry standard firewalls and security will protect systems. Systems will be updated for security as new standards for protection occur. Back up procedures further protect system management.

Super Teaching—Information Delivery System: Software Requirements Document

J. Bolach (Bo)

Apr. 11, 2001

System Description

The Super Teaching—Information Delivery System (ST SYSTEM) is an automated software system used to control video and audio sources in such a way that a display pattern is presented on three screens in either a user controlled or random manner.

Project Scope

The project scope defines the boundary markers of the project. If individual project goals and tasks fail to fall within the scope of the project, then the project would be reevaluated and possibly modified. The items below list the high level components within the project scope of the ST System.

b. A Graphical User Interface
    c. System databases and internal data structures
    d. Application software and supporting algorithms
    e. Communication with and/or control of attached hardware devices
    f. Configuration and maintenance of the system's initialization and operating parameters
    g. Diagnostics and error reporting
    h. Software installation and maintenance
    i. Online help and documentation
    j. Remote Learning Facilities
    k. Adjustable table Controllers for "active and relationship pattern flow" to Screens.

Assumptions

A constant Internet connection with an external firewall will be available for the ST System.

The ST System will be installed on a dedicated computer with access restricted to authorized personnel. Normal users will not be allowed to add, update or remove software.

Software Requirements

The initial ST System will provide for the following video and audio sources, with the capability to easily install additional devices.

Instructor Camera
    Student Camera(s)
    Document Camera
    VCR
    DVD
    Cable TV
    Computer (internet, power point, etc.)
    1 Remote learning site (T1)
    Annotation Device Control
    Audio input output device control
    Wall Paper (nature scene) dedicated source (multiple DVD player system)

The ST System will be designed and built to run on a Windows 2000 operating system platform.

The user will interact with the ST System by logging in and being presented with a Graphical User Interface (GUI). The GUI will include the following functionality:

Allow a user to select a source as the "active source".
    Provide device level control of the active source.
    Display the active source in a video box on the GUI.
    Make control of audio levels readily accessible.
    Permit the user to freeze (or unfreeze) the active source on all three screens for an indefinite period of time or prescribed time options (buttons for three and five minute options.)
    Give the user access to online help.
    Offer access to and maintenance of user specific presets (camera presets, source priority levels).
    Make it easy to start and end an ST session.

The video switching component will route the active video source through an annotation device (if present).

Provide for relay control of projector lifts and motorized screens.

If possible the system should sense when the Document Camera is active without requiring the user to make a GUI selection.

If possible the system should sense when PowerPoint slides "move" against program definition for pattern shifting.

Future revisions of the software should permit some type of room lighting management.

Internal system procedures will be put in place to allow for software error reporting and messaging.

Software patches and upgrades should be distributed via the Internet and scheduled to install during system downtime via batch job criteria with job completion reporting.

The system needs to be developed so that it can be easily adapted to different languages, allowing for a global market.

A timeout policy will be in place allowing for the shutdown of equipment over extended periods of time with no activity.

An internal rules engine will govern generation of deliverable images (information or Deliverable) by equating the timing constraints, priority levels, and previous display times of each video source (Source) as input into a random effects generator (Effects). The deliverable will then be factored into a pattern (Pattern) to provide a total projected view on all three screens (Total View). The tables resulting from this procedure can be easily modified.

Source+Effects=Deliverable

Deliverable=Pattern=Total View

An automated control bar—will permit user adjustment of the "tables" such that "weight" to a priority "active source" may override defaults via moving the slider on the control bar, much like an audio control GUI for any windows PC system. The slider automatically "relates" to adjust the tables created in M above.

Note: The integration of hardware and software when applied to classroom learning, defines the proprietary ILT Super Teaching System as patent protected, copyright protected, and trade mark protected in 2001.

What is claimed is:

1. A method for delivering instructional information, the method comprising:

displaying an image of instructional information on one or more of at least three visual electronic displays prior to a triggering event, the instructional information comprising a plurality of images selected by an instructor as part of a lesson plan, the plurality of images comprising material directed to a topic within the lesson plan, the electronic displays in one room;

varying display of the image of the instructional information in an instructional varying display pattern on at least a portion of the at least three visual electronic displays in response to the triggering event, wherein the instructional varying display pattern comprises displaying the image of the instructional information in a plurality of image patterns in a near term by a hardware controller, each image display pattern comprising information display attributes; and varying a display of background information on each of the at least three visual electronic displays not displaying instructional information, the background information comprising a stored collection that is not part of the instructional information, the background information displayed with a background varying display pattern, wherein the background varying display pattern comprises displaying a plurality of image patterns in the near term, by a hardware controller, each image display pattern comprising information display attributes;

wherein the information display attributes comprise
varying which of the at least three visual electronic displays is displaying the instructional information and the background information;

and varying one or more of
duration of a display of the instructional information on a display of the at least three visual electronic displays;
duration of a display of the background information on a display of the at least three visual electronic displays;
one or more transition effects associated with a display of the instructional information;
one or more transition effects associated with a display of the instructional information;
timing between displays of the instructional information; and
timing between displays of the background information, wherein the instructional varying display pattern and the background varying display pattern are each displayed and the information display attributes of associated image patterns are varied such that duplication of an image pattern within the instructional varying display pattern and the background varying display pattern on the at least three visual electronic displays is precluded in the near term.

2. The method of claim 1, wherein one or more of the instructional varying display pattern and the background varying display pattern comprise randomly varying one or more of the information display attributes.

3. The method of claim 1, wherein the image patterns of one or more of the instructional varying display pattern and the background varying display pattern are not repeated during a teaching session, each of the image patterns comprising a different combination of the information display attributes.

4. The method of claim 1, wherein the image patterns of one or more of the instructional varying display pattern and the background varying display pattern are limited to duplication at a minimum frequency within the one or more of the instructional varying display pattern and the background varying display pattern such that duplication of an image pattern within the one or more of the instructional varying display pattern and the background varying display pattern is precluded in a near term, each of the image patterns comprising a different combination of the information display attributes.

5. The method of claim 1, wherein the triggering event comprises one or more of
reaching a time limit; and
receiving a command from an operator.

6. The method of claim 1, wherein the image of the instructional information comprises first instructional information and further comprising second instructional information, the second instructional information comprising an image of the plurality of images selected by the instructor, wherein the triggering event comprises displaying the second instructional information on at least one of the visual electronic displays, the first instructional information is displayed with the instructional varying display pattern on at least one visual electronic display not displaying the second instructional information.

7. The method of claim 1, further comprising displaying an additional image of the instructional information in an additional instructional varying display pattern on the at least three visual electronic displays, the additional image of the instructional information comprising an image of the plurality of images selected by the instructor, wherein the additional image of the instructional varying display pattern comprises varying one or more of the information display attributes such that duplication of an image pattern within the instructional varying display pattern and the additional instructional varying display pattern is precluded in a near term.

8. The method of claim 1, further comprising a second triggering event wherein display of the image of the instructional information is halted in response to the second triggering event, wherein the second triggering event comprises one or more of
receiving a command from an operator;
reaching a time limit; and
reaching a limit for a number of times the instructional information is displayed.

9. The method of claim 8, wherein the image of the instructional information comprises first instructional information and further comprising second instructional information and further comprising displaying the second instructional information in an instructional varying display pattern on at least a portion of the at least three visual electronic displays in response to the second triggering event.

10. The method of claim 1, wherein the instructional information comprises one or more of:
an image provided by a document camera;
an image generated from one or more electronic files; and
an image of an instructor.

11. The method of claim 1, wherein the background information comprises an image of one or more students in a classroom, the classroom comprising the at least three visual electronic displays.

12. The method of claim 1, wherein the background information comprises one or more nature scenes.

13. The method of claim 1, wherein the background information comprises one or more of
pictures;
scientific information;
economical information;
financial information;
mathematical information;
theological information;
biological information; and
statistical information.

14. The method of claim 1, further comprising an additional image of instructional information that is related to the image of the instructional information by subject matter wherein the instructional varying display pattern further comprises varying displays of the image of the instructional information and the additional image of the instructional information, wherein the additional image of instructional information is not part of the plurality of images comprising material directed to a topic within the lesson plan.

15. The method of claim 1, wherein two or more of the at least three visual electronic displays are combined onto one or more display devices.

16. The method of claim 1, wherein one of the at least three visual electronic displays is further divided into a plurality of viewing areas.

17. The method of claim 1, further comprising interrupting the instructional varying display pattern to display the instructional information without a varying display pattern on one or more of the three visual electronic displays.

18. The method of claim 1, further comprising one or more tables, wherein the one or more tables comprise the information display attributes for each image pattern.

19. The method of claim 1, further comprising one or more tables, wherein the one or more tables comprise a number of image patterns to display information for a 50 minute class without repeating any of the image patterns based on timing of the instructional varying display pattern and the background varying display pattern, each of the image patterns comprising a different combination of the information display attributes.

20. A system for delivering instructional information, the system comprising:
a processor;
one or more output devices comprising at least three visual displays; and
a computer readable medium having computer usable program code executing on the processor to perform operations comprising
displaying an image of instructional information on one or more of the at least three visual displays prior to a triggering event, the instructional information comprising a plurality images selected by an instructor as part of a lesson plan, the plurality of images comprising material directed to a topic within the lesson plan, the electronic displays in one room;
varying display of the image of the instructional information in an instructional varying display pattern on at least a portion of the at least three visual displays in response to the triggering event, wherein the instructional varying display pattern comprises displaying the image of the instructional information in a plurality of image patterns in a near term, by the processor, each image display pattern comprising information display attributes; and
varying a display of background information on each of the at least three visual displays not displaying instructional information, the background information comprising a stored collection that is not part of the instructional information, the background information displayed with a background varying display pattern, wherein the background varying display pattern comprises displaying a plurality of image patterns in the near term, by the processor, each image display pattern comrising information display attributes,
wherein the information display attributes comprise
varying which of the at least three visual displays is displaying the instructional information and the background information;
and varying one or more of
duration of a display of the instructional information on a display of the at least three visual displays;
duration of a display of the background information on a display of the at least three visual electronic displays;
one or more transition effects associated with a display of the instructional information;
one or more transition effects associated with a display of the instructional information;
timing between displays of the instructional information; and
timing between displays of the background information,
wherein the instructional varying display pattern and the background varying display pattern are each displayed and the information display attributes of associated image patterns are varied such that duplication of an image pattern within the instructional varying display pattern and the background varying display pattern on the at least three visual electronic displays is precluded in the near term.

21. The system of claim 20, further comprising one or more of a document camera;
a camera directed at an operator;
a camera directed at one or more students;
one or more microphones;
one or more speakers;
a laser belt pack; and
one or more remotes.

22. A computer program product comprising a non-transitory computer readable storage medium having computer usable program code executable on a processor to perform operations for delivering instructional information, the operations of the computer program product comprising:
displaying an image of instructional information on one or more of at least three visual electronic displays prior to a triggering event, the instructional information comprising a plurality of images selected by an instructor as part of a lesson plan, the plurality of images comprising material directed to a topic within the lesson plan, the electronic displays in one room;
varying display of the image of the instructional information in an instructional varying display pattern on at least a portion of the at least three visual electronic displays in response to the triggering event, wherein the instructional varying display pattern comprises displaying the image of the instructional information in a plurality of image patterns in a near term, by a hardware controller, each image display pattern comprising information display attributes; and
varying a display of background information on each of the at least three visual electronic displays not displaying instructional information, the background information comprising a stored collection that is not part of the instructional information, the background information displayed with a background varying display pattern, wherein the background varying display pattern comprises displaying a plurality of image patterns in the near term, by a hardware controller, each image display pattern comprising information display attributes;
wherein the information display attributes comprise
varying which of the at least three visual electronic displays is displaying the instructional information and the background information;
and varying one or more of
duration of a display of the instructional information on a display of the at least three visual electronic displays;
duration of a display of the background information on a display of the at least three visual electronic displays;
one or more transition effects associated with a display of the instructional information;
one or more transition effects associated with a display of the instructional information;
timing between displays of the instructional information; and timing between displays of the background information,
wherein the instructional varying display pattern and the background varying display pattern are each displayed and the information display attributes of associated image patterns are varied such that duplication of an image pattern within the instructional varying display pattern and the background varying display pattern on the at least three visual electronic displays is precluded in the near term.

23. The computer program product of claim 22, wherein the operations of the computer program product further comprises selecting and displaying additional background information in an additional background varying display pattern.

24. The computer program product of claim 22, wherein the operations of the computer program product further comprise receiving a command from an operator to display an additional image of instructional information and displaying the additional instructional information in an additional instructional varying display pattern on the at least three visual displays, wherein the additional image of the instructional varying display pattern comprises varying one or more of the information display attributes such that duplication of an image pattern within instructional varying display pattern and the additional instructional varying display pattern is precluded in a near term.

25. The method of claim 1, wherein, in response to the triggering event, the information display attributes for the instructional varying display pattern and the information display attributes for the background varying display pattern are varied independent of an operator.

* * * * *